US012776807B2

(12) United States Patent
Kolze et al.

(10) Patent No.: US 12,776,807 B2
(45) Date of Patent: Oct. 27, 2026

(54) SYSTEMS AND METHODS FOR OPTIMIZING BIT LOADING PROFILES FOR CABLE MODEMS

(71) Applicant: Avago Technologies International Sales Pte. Limited, Singapore (SG)

(72) Inventors: Thomas Kolze, Phoenix, AZ (US); Hong Liu, Irvine, CA (US); Roger Fish, Superior, CO (US); Gordon Yong Li, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 68 days.

(21) Appl. No.: 19/040,275

(22) Filed: Jan. 29, 2025

(65) Prior Publication Data

US 2026/0074742 A1 Mar. 12, 2026

Related U.S. Application Data

(60) Provisional application No. 63/694,707, filed on Sep. 13, 2024, provisional application No. 63/693,158, filed on Sep. 10, 2024, provisional application No. 63/691,619, filed on Sep. 6, 2024.

(51) Int. Cl.
*H04B 3/46* (2015.01)
*H04L 12/28* (2006.01)

(52) U.S. Cl.
CPC ........... *H04B 3/46* (2013.01); *H04L 12/2801* (2013.01)

(58) Field of Classification Search
CPC .............................. H04B 3/46; H04L 12/2801
See application file for complete search history.

(56) References Cited

U.S. PATENT DOCUMENTS

| | | | |
|---|---|---|---|
| 2010/0020896 A1* | 1/2010 | Willems | H04L 1/0668 375/295 |
| 2014/0023189 A1 | 1/2014 | Lins De Medeiros et al. | |
| 2014/0177750 A1 | 6/2014 | Kolze et al. | |
| 2014/0294052 A1 | 10/2014 | Currivan et al. | |
| 2014/0301734 A1 | 10/2014 | Fang | |
| 2017/0141887 A1* | 5/2017 | Garcia | H04L 43/16 |
| 2018/0262412 A1* | 9/2018 | Hanks | H04L 67/303 |
| 2021/0091989 A1 | 3/2021 | Zaltsman et al. | |
| 2022/0239758 A1 | 7/2022 | Klein et al. | |

OTHER PUBLICATIONS

Data-Over-Cable Service Interface Specifications DOCSIS? 3.1 “Physical Layer Specification” dated Apr. 19, 2023.

(Continued)

*Primary Examiner* — Sung S Ahn
(74) *Attorney, Agent, or Firm* — Foley & Lardner LLP

(57) ABSTRACT

In some implementations, one or more processors receive a loss target value and a plurality of receive modulation error ratio (RxMER) values corresponding to a plurality of subcarriers of a cable modem, determine a first set of constellation sizes corresponding to the plurality of subcarriers, calculate a plurality of loss values corresponding to the plurality of subcarriers based at least on the plurality of RxMER values and the first set of constellation sizes, generates a second set of constellation sizes corresponding to the plurality of subcarriers based at least on the loss target value and the plurality of loss values.

20 Claims, 10 Drawing Sheets

(56) References Cited

OTHER PUBLICATIONS

Non-Final Office Action on U.S. Appl. No. 19/040,279 DTD Jun. 1, 2026.
Notice of Allowance on U.S. Appl. No. 19/042,292 DTD Apr. 28, 2026.
Notice of Allowance on U.S. Appl. No. 19/039,983 DTD Aug. 18, 2026.

* cited by examiner

600

750

SYSTEMS AND METHODS FOR OPTIMIZING BIT LOADING PROFILES FOR CABLE MODEMS

CROSS-REFERENCE TO RELATED APPLICATIONS

This application claims the benefit of and priority to U.S. Provisional Patent Application No. 63/691,619 filed on Sep. 6, 2024, U.S. Provisional Patent Application No. 63/693,158 filed on Sep. 10, 2024 and U.S. Provisional Patent Application No. 63/694,707 filed on Sep. 13, 2024, which are incorporated herein by reference in their entirety for all purposes. U.S. patent application Ser. No. 19/039,983 filed on Jan. 29, 2025 is incorporated herein by reference in its entirety for all purposes.

FIELD OF THE DISCLOSURE

This disclosure generally relates to systems and methods for improving modulation/demodulation process of a communications system, including but not limited to systems and methods of optimizing bit loading profiles for high net bit rate of cable modems.

BACKGROUND

The net bit rate refers to a rate at which useful information is transmitted over a communication channel, excluding any error-correcting codes or other protocol overhead. The net bit rate can serve as a figure of merit for a cable modem's overall link "health." The net bit rate can be a function of multiple parameters of an Orthogonal Frequency-Division Multiplexing (OFDM) channel. There is a need/benefit to optimize the performance of a cable modem for high net bit rate.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
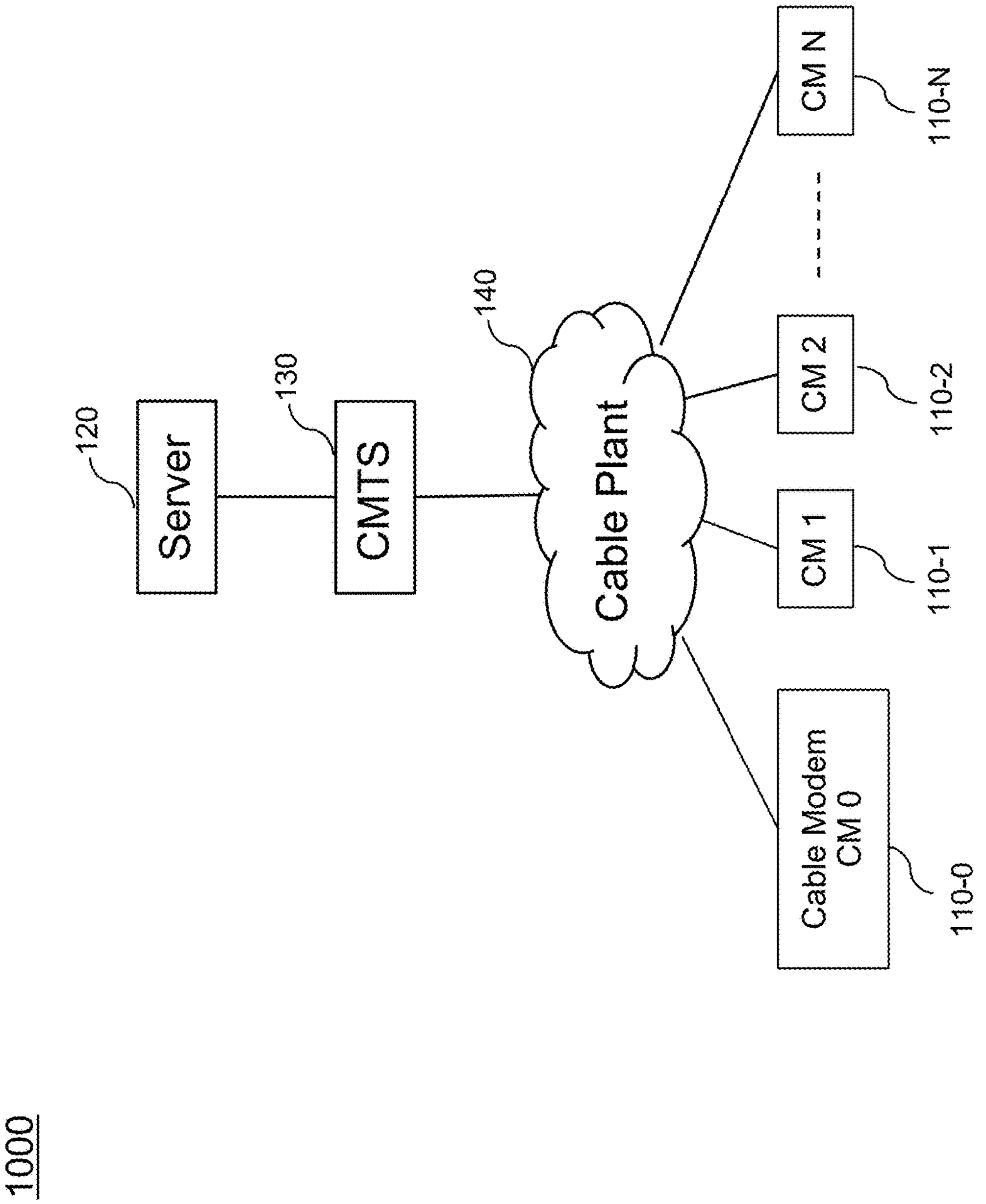
FIG. 1 is a diagram depicting an example communication environment with a plurality of cable modems and a server, according to one or more embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram depicting an example communication environment 1000 with a plurality of cable modems 110-0, 110-1, . . . , 110-N, a server 120, a cable modem termination system (CMTS) 130, and/or a cable plant 140, according to one or more embodiments. Here, the term "cable modem" refers to a device that can function as a bridge between a local network and an internet service provider (ISP) using the same coaxial cable infrastructure that delivers cable television, a device that can convert (e.g., demodulate) data signals received from an ISP using the coaxial cable infrastructure into a format that devices in a local network (e.g., local area network (LAN)) can use, and convert (e.g., modulate) data signals from the LAN into an analog signal that can be transmitted to the ISP using the coaxial cable infrastructure, or any device that can connect a local network to the Internet using the same coaxial cable infrastructure. The term "cable modem termination system (CMTS)" refers to a system, device or equipment that is used by cable internet service providers to manage and facilitate communication between cable modems and the internet, is located in a cable company's headend or hubsite to provide data services such as cable internet or Voice over IP (VOIP) to cable subscribers, and/or enables communication with subscribers' cable modems. The term "cable plant" refers to a cable network, an HFC (hybrid fiber-Coaxial) cable network, or any physical infrastructure used for cable television and internet services. The cable plant may include all the cables, connectors, amplifiers, and other equipment used to deliver these services to customers. Each cable modem 110-0, 110-1, . . . , 110-N can include one ore more ports for the coaxial cable from an ISP, an Ethernet port to connect to a router or a computer in a local network, and/or additional ports for telephony services. Each cable modem 110-0, 110-1, . . . , 110-N can have configuration similar to configuration of a computing system 2000 in FIG. 2. The server 120 can have configuration similar to configuration of a computing system 2000 in FIG. 2. The server 120 may include a computing device (e.g., computing system 2000) and/or a cloud system. The cloud system refers to a system that can deliver one or more services over the Internet. The one or more services can include one or more services of infrastructure as a service (IaaS), platform as a service (PaaS), or software as a service (SaaS). The CMTS 130 may include a computing device (e.g., computing system 2000). The cable plant 140 may be a component in a connection between the server 120 and the cable modems 110-0, . . . 110-N. In some implementations, the cable plant may be a component in a connection between the CMTS 130 and the cable modems. In some implementations, the server 120 may include a downstream modulator for modulating downstream transmissions which the cable plant 140 conveys to the cable modems, which then perform demodulation of the downstream transmissions. In some implementations, the CMTS 130 may include a downstream modulator for modulating downstream transmissions which the cable plant 140 conveys to the cable modems, which then perform demodulation of the downstream transmissions. Each cable modem can transmit or receive data (e.g., telemetry data) to the server 120 and/or CMTS 130. For example, each cable modem can automatically collect and transmit data to the server for monitoring and analysis.

Figure 2:
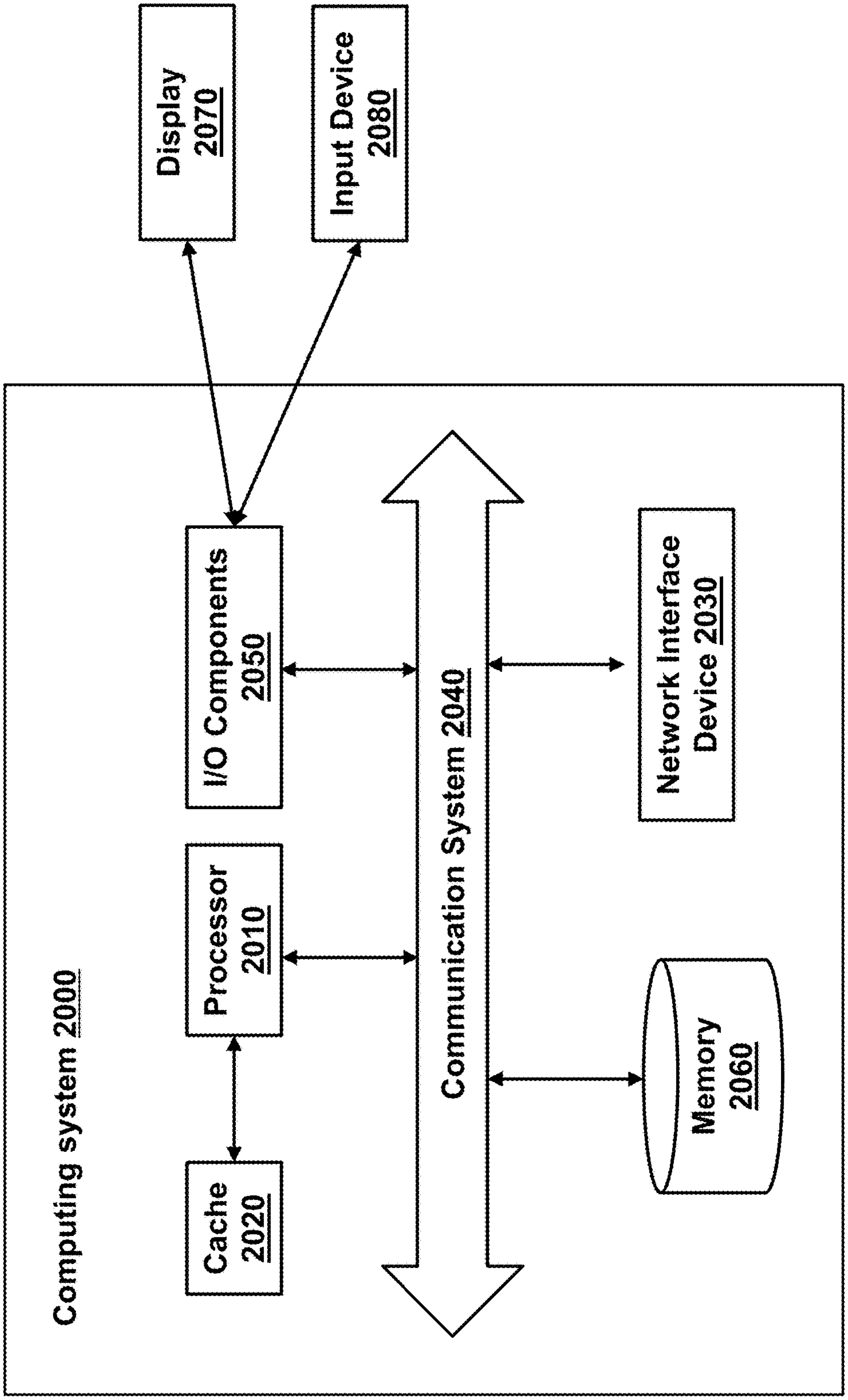
FIG. 2 is a schematic block diagram of a computing system, according to one or more embodiments.

FIG. 2 is a schematic block diagram of a computing system, according to an embodiment. An illustrated example computing system 2000 includes one or more processors 2010 in direct or indirect communication, via a communication system 2040 (e.g., bus), with memory 2060, at least one network interface controller 2030 with network interface port for connection to a network (not shown), and other components, e.g., input/output ("I/O") components 2050. Generally, the processor(s) 2010 will execute instructions (or computer programs) received from memory. The processor(s) 2010 illustrated incorporate, or are connected to, cache memory 2020. In some instances, instructions are read from memory 2060 into cache memory 2020 and executed by the processor(s) 2010 from cache memory 2020. The computing system 2000 may not necessarily contain all of these components shown in FIG. 2 and may contain other components that are not shown in FIG. 2.

In more detail, the processor(s) 2010 may be any logic circuitry that processes instructions, e.g., instructions fetched from the memory 2060 or cache 2020. In many implementations, the processor(s) 2010 are microprocessor units or special purpose processors. The computing device 2050 may be based on any processor, or set of processors, capable of operating as described herein. The processor(s) 2010 may be single core or multi-core processor(s). The processor(s) 2010 may be multiple distinct processors.

The memory 2060 may be any device suitable for storing computer readable data. The memory 2060 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 2000 may have any number of memory devices 2060.

The cache memory 2020 is generally a form of computer memory placed in close proximity to the processor(s) 2010 for fast read times. In some implementations, the cache memory 2020 is part of, or on the same chip as, the processor(s) 2010. In some implementations, there are multiple levels of cache 2020, e.g., L2 and L3 cache layers.

The network interface controller 2030 manages data exchanges via the network interface (sometimes referred to as network interface ports). The network interface controller 2030 handles the physical and data link layers of the OSI model for network communication. In some implementations, some of the network interface controller's tasks are handled by one or more of the processor(s) 2010. In some implementations, the network interface controller 2030 is part of a processor 2010. In some implementations, the computing system 2000 has multiple network interfaces controlled by a single controller 2030. In some implementations, the computing system 2000 has multiple network interface controllers 2030. In some implementations, each network interface is a connection point for a physical network link (e.g., a cat-5 Ethernet link). In some implementations, the network interface controller 2030 supports wireless network connections and an interface port is a wireless (e.g., radio) receiver or transmitter (e.g., for any of the IEEE 802.11 protocols, near field communication "NFC", Bluetooth, ANT, or any other wireless protocol). In some implementations, the network interface controller 2030 implements one or more network protocols such as Ethernet. Generally, a computing device 2050 exchanges data with other computing devices via physical or wireless links through a network interface. The network interface may link directly to another device or to another device via an intermediary device, e.g., a network device such as a hub, a bridge, a switch, or a router, connecting the computing device 2000 to a data network such as the Internet.

The computing system 2000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 2000 may include an interface (e.g., a universal serial bus (USB) interface) for connecting input devices, output devices, or additional memory devices (e.g., portable flash drive or external media drive). In some implementations, a computing device 2000 includes an additional device such as a co-processor, e.g., a math co-processor can assist the processor 2010 with high precision or complex calculations.

The components 2090 may be configured to connect with external media, a display 2070, an input device 2080 or any other components in the computing system 2000, or combinations thereof. The display 2070 may be a liquid crystal display (LCD), an organic light emitting diode (OLED) display, a flat panel display, a solid state display, a cathode ray tube (CRT) display, a projector, a printer or other now known or later developed display device for outputting determined information. The display 2070 may act as an interface for the user to see the functioning of the processor (s) 2010, or specifically as an interface with the software stored in the memory 2060.

The input device 2080 may be configured to allow a user to interact with any of the components of the computing system 2000. The input device 2080 may be a plurality pad, a keyboard, a cursor control device, such as a mouse, or a joystick. Also, the input device 2080 may be a remote control, touchscreen display (which may be a combination of the display 2070 and the input device 2080), or any other device operative to interact with the computing system 2000, such as any device operative to act as an interface between a user and the computing system 2000.

In one aspect, cable operators have long held valuable the ability to estimate a signal-to-noise ratio (SNR) margin of downstream digital communications links at a cable modem (e.g., each cable modem in a plant or cable networks). The SNR margin in a cable modem refers to the difference between an actual signal strength and a minimum signal strength required to maintain a reliable connection, or any measure of the quality of the signal received by the cable modem. Specifically, cable operators have expressed the high value of the SNR Margin estimation capability developed for a cable television system defined by a standard like ITU-T J.83B. ITU-T J.83B also defines a standard for downstream cable transmission with single-carrier quadrature amplitude modulation (SC-QAM) with constellation sizes of 64-QAM and 256-QAM, and Forward Error Correction (FEC) which is a concatenated coding scheme. For example, upon installations or repairs of a cable modem (for customers), with a ITU-T J.83B-compatible SNR margin estimation tool, technicians can obtain an SNR margin estimate for the downstream link, and check if the cable modem achieves 3 dB or more of margin using the estimation tool (to check if the cable modem has been successfully installed or repaired).

In one aspect, with the roll-out of data over cable service interface specifications (DOCSIS) 3.1 and Orthogonal Frequency-Division Multiplexing (OFDM) and new FEC thereof, the conventional SNR margin estimation was no longer available with the new FEC. With DOCSIS OFDM, many variations of bit loading (and mixes of constellation size among the data carrying subcarriers) are possible. For example, with DOCSIS OFDM, cable modems support four different profiles (or bit profiles), and another profile for test purposes. Here, the "profile" (also referred to as "bit profile" or "bit loading profile") refers to a specific configuration (e.g., number of bits that can carry traffic, modulation orders, constellation density, constellation size, etc.) for each subcarrier within an OFDM.

In one aspect, the net bit rate refers to a rate at which useful information is transmitted over a communication channel, excluding any error-correcting codes or other protocol overhead. The net bit rate can serve as a figure of merit for a cable modem's overall link "health." The net bit rate can be a function of multiple parameters of an OFDM channel. The net bit rate can be calculated from a bit loading. DOCSIS Operations Support System Interface (OSSI) describes a method for calculating net bit rate which is a DOCSIS parameter for an OFDM profile. There is a need/benefit to optimize the performance of a cable modem for high net bit rate. For example, it is highly desirable to know the maximum, or optimal, bit loading profile in terms of net bit rate for a cable modem in its current environment. The net bit rate of a maximum (optimal) bit loading profile for a cable modem can serve as a valuable figure of merit for a cable modem's overall link "health" (e.g., performance or quality of a network link), even if that optimal bit loading profile is not currently in use for that cable modem.

To solve these problems, systems and methods according to some embodiments of the present disclosure can optimize OFDM in channels for cable modems for high net bit rate. In some implementations, a system can find, identify, obtain, synthesize, or generate an optimal bit loading profile with DOCSIS OFDM. In some implementations, the system can perform a cable modem-based synthesis of an optimal bit loading profile for a cable modem given a receive modulation error ratio (RxMER) vector. RxMER refers to a ratio between average signal power of a received signal and average noise power of the signal, or a ratio between power of the received signal to power of errors in the signal. An RxMER value can indicate how well a signal is being received such that higher RxMER values indicate better signal quality. In some implementations, the RxMER vector can include a plurality of RxMER values, each corresponding to a data subcarrier (also referred to as "subcarrier") of a plurality of data subcarriers (also referred to as "subcarriers") across an OFDM channel. In other words, the RxMER vector can include a plurality of signal-to-noise ratio (SNR) values, each corresponding to a data subcarrier of a plurality of data subcarriers across an OFDM channel. In some implementations, RxMER values can be measured in a digital receiver after demodulation, with or without adaptive equalization. This measurement of RxMER values can be performed by field meters, set-top boxes, cable modems, and/or cable modem termination system (CMTS) upstream receivers. In some implementations, SNR values can be measured in an interface of a cable modem, the modem interface providing various diagnostic tools and metrics. This measurement of SNR values can include measuring a downstream power level and/or an upstream power level compared to the level of noise on the connection to/from the cable modem. A subcarrier refers to a sideband of a radio frequency carrier wave that can be modulated to send information. Subcarriers can be used to carry separate streams of data within the same channel. In OFDM, multiple subcarriers can be used to transmit data simultaneously, improving the efficiency and robustness of a communication system.

In some implementations, given an RxMER vector (e.g., an RxMER value for each data subcarrier) in a DOCSIS OFDM downstream channel, a system (e.g., cable modem or a remote server) can synthesize an optimal bit loading for OFDM data subcarriers such that the optimal bit loading can achieve the highest net bit rate possible for the OFDM channel in a cable modem. As a result of the synthesis of the optimal bit loading profile, the total number of bits in all the data subcarriers, or similarly the net bit rate of the OFDM profile, can be used as a figure of merit for the cable modem in that OFDM channel.

In some implementations, the system can perform a synthesis of an optimal bit loading profile for OFDM, and provide, as a result, (1) a metric for assessing the "health" of a cable modem and comparing the metric to the own history of the cable modem and to a metric of other cable modems; and (2) a solution (e.g., a result bit loading profile) for achieving the highest bit rate possible for the cable modem given its current SNR (e.g., an RxMER vector, assuming it is stationary or non-time-varying) across the OFDM channel. Thus, the system can not only provide a useful health/status monitor for each cable modem, but also can provide a solution for achieving the highest bit loading profile possible for the cable modem given its current RxMER status in the OFDM channel. In some implementations, for any RxMER vector in a trial scenario, the system can synthesize an optimal bit loading profile for such a trial scenario.

In some implementations, a communication environment may include a cable modem for performing a synthesis and/or analysis of a bit loading profile. The cable modem can have configuration similar to configuration of computing system 2000. The cable modem can include a bit loading analyzer. The bit loading analyzer can be implemented in hardware (e.g., circuitry or processor), firmware, software, or a combination thereof. The bit loading analyzer can perform a synthesis and/or analysis of bit loading for the cable modem, and output a result of the synthesis and/or analysis (e.g., identify, generate, synthesize or calculate an optimal bit loading profile). The optimal bit loading profile can include constellation sizes or constellation densities corresponding to a plurality of data subcarriers (or referred to as "subcarriers") of an OFDM channel in the cable modem. The cable modem can use the optimal bit loading profile to set constellation sizes for QAM modulation. The cable modem can perform demodulation using the optimal bit loading profile.

In some implementations, a communication environment may include a plurality of cable modems and a server for performing a synthesis and/or analysis of a bit loading profile. Each of the plurality of cable modems and the server can have configuration similar to configuration of computing system 2000. In some implementations, the cable modem (among the plurality of cable modems) can include an SNR margin monitor. The SNR margin monitor can be implemented in hardware (e.g., circuitry or processor), firmware, software, or a combination thereof. The SNR margin monitor can perform an SNR margin calculation or estimation, monitor SNR margin estimates, and detect or trigger an event (e.g., an SNR margin value falls below or exceeds a threshold value, or a change of the SNR margin value lies outside the bounds). The SNR margin monitor can work on any profile, whether it is loaded into the cable modem as an active or inactive profile or even if it is not in use at all, so that the SNR margin monitor can work on the synthesized optimal profile even if it is not a loaded profile into the cable modem. In response to detecting the event, the cable modem can send the event and/or related data (e.g., SNR margin data, RxMER data, etc.) to the server. In response to receiving the event, the server can perform a synthesis and/or analysis of bit loading for the cable modem, output a result of the synthesis and/or analysis (e.g., identify, generate, synthesize or calculate an optimal bit loading profile), and send the result of the analysis to the cable modem. In response to receiving the analysis result, the cable modem can use the optimal bit loading profile to set constellation sizes for QAM modulation. The cable modem can perform demodulation using the optimal bit loading profile. In some implementations, only some cable modems (e.g., only CM 0 and CM 1 among CM 0, . . . , CM N) can proactively send data back to the server after triggering the events, thereby streamlining the bit loading profile analysis/synthesis process.

In some implementations, a communication environment may include at least one cable modem and a server for performing a synthesis and/or analysis of a bit loading profile. Each of the cable modem and the server can have configuration similar to configuration of computing system 2000. In some implementations, the cable modem can include an OFDM receiver, an RxMER pre-processor and/or an RxMER data scheduler. Each of the OFDM receiver, the RxMER pre-processor and the RxMER data scheduler can be implemented in hardware (e.g., circuitry or processor), firmware, software, or a combination thereof. The OFDM receiver can receive traffic through a plurality of OFDM channels, each channel including a plurality of subcarriers. The RxMER pre-processor can receive and pre-process demodulation data and output RxMER values. In some implementations, each of the RxMER values can correspond to a subcarrier of the plurality of subcarriers. The RxMER data scheduler can send pre-processed RxMER values to the server periodically or upon events (e.g., an SNR margin value falls below or exceeds a threshold value, or a change of the SNR margin value lies outside the bounds) so that the server can perform a synthesis or analysis of bit loading profiles using the pre-processed RxMER values.

In some implementations, the server can include a bit loading analyzer which can be implemented in hardware (e.g., circuitry or processor), firmware, software, or a combination thereof. In response to receiving the pre-processed RxMER values from the cable modem, the bit loading analyzer can receive input data (e.g., SNR margin target, Rx hardware attributes such as a manufacturer make and model number and chip model numbers), perform a synthesis and/or analysis of bit loading for the cable modem, output a result of the synthesis and/or analysis (e.g., a new modulation configuration including an optimized bit loading profile, an average number of bits per subcarrier and/or other parameters for modulation configuration), and send the new modulation configuration to the cable modem. In response to receiving the new modulation configuration, the cable modem can use the optimal bit loading profile to set constellation sizes for QAM modulation. The cable modem can perform demodulation using the optimal bit loading profile.

In some implementations, a system (e.g., a cable modem or a server) can include a bit loading analyzer. The bit loading analyzer can be implemented in hardware (e.g., circuitry or processor), firmware, software, or a combination thereof. The bit loading analyzer can receive, as input data, demodulation data (e.g., pre-processed demodulation data such as RxMER values) and/or a bit loading profile (e.g., current bit loading profile) relating to a cable modem, perform a synthesis and/or analysis of bit loading for the cable modem, and output a new bit loading profile for the cable modem.

For $m^{th}$ subcarrier of n subcarriers in an OFDM channel ($1 \le m \le n$; m, n are integers), $BL_m$ denotes the constellation size or bit loading on the $m^{th}$ subcarrier. Total_BL denotes the total bit loading of the OFDM channel which is the sum of $BL_m$ over all m. A loss value on $m^{th}$ subcarrier is denoted by $LV_m$. Here, the "loss" value or "loss" for each data subcarrier refers to a symbol error rate (SER) or bit error rate (BER) for a QAM constellation at a given SNR (or RxMER), an expected value of SER or BER for a QAM constellation at a given SNR (or RxMER), or any error metric for the QAM constellation at the given SNR. As an example, in some FEC systems, some received bits with known low SNR may be "erased" by the FEC decoder, and the "cost" of such erasures in typical such decoders is only half as much as a bit error. The "loss" values synthesized for use in the SNR Margin Estimation invention, and in use in this invention, are developed to match the FEC coding, modulation and demodulation, and FEC decoding capabilities. In some implementations, the loss value or loss can be a function of a constellation size and an RxMER value. In some implementations, the system can identify, obtain, or determine a loss target value (denoted by "Loss_Target") for a cable modem model type of cable modem. In some implementations, Loss_Target can be a loss value which is dependent on a modulator of the cable modem. In some implementations, the system can learn Loss_Target for cable modems operating in a plant (e.g., cable networks) with test profiles operating in a channel, as provided in DOCSIS specifications for OFDM. For example, when the error statistics corresponding to a cable modem are made available to the server and/or an aggressive test profile (forcing operation of the cable modem to near FEC threshold) is provided, the system can obtain, identify, learn, or calculate Loss_Target for the cable modem using the error statistics and/or the aggressive test profile.

In some implementations, given a constellation size $BL_m$ corresponding to a subcarrier, a complementary value of a loss value (referred to as "complement value" or "bits correct value" denoted by $CV_m$) corresponding to the subcarrier can be defined as follows:

$$\text{Complement Value } (CV_m) = \text{constellation size } (BL_m) - \text{loss value } (LV_m) \quad \text{(Equation 1)}$$

In some implementations, a complement value $CV_m$ corresponding to a subcarrier can indicate a probability that QAM bits of the subcarrier (according to the constellation size of the subcarrier) are received correctly. For example, a complement value $CV_m$ for a single QAM bit can be one minus the corresponding loss value (e.g., BER).

Each data subcarrier ($m^{th}$ subcarrier) can have $CV_m$ and $LV_m$, depending on the subcarrier's RxMER value (denoted by $RxMER_m$) and its constellation size $BL_m$. Total Loss denotes the total loss value of the OFDM channel which is the sum of $LV_m$ over all m.

$$\text{Total\_Loss} = \sum_{m=1}^{n} LV_m \quad \text{(Equation 2)}$$

Total_Complement denotes the total complement value of the OFDM channel which is the sum of $CV_m$ over all m.

$$\text{Total\_Complement} = \sum_{m=1}^{n} CV_m \quad \text{(Equation 3)}$$

In some implementations, a RxMER vector can include a plurality of RxMER values $RxMER_m$ corresponding to a plurality of subcarriers of a channel (e.g., n subcarriers in an OFDM channel; $1 \le m \le n$; m, n are integers). In some implementations, each of a plurality of constellation sizes (or constellation densities) $BL_m$ can correspond to a subcarrier of the plurality of subcarriers (e.g., $m^{th}$ subcarrier). In some implementations, each of the constellation sizes $BL_m$ can include, for example, 0, 4, 6, 7, 8, 9, 10, 11, and 12 (bits). In some implementations, the system can include a loss table (e.g., in a memory). The loss table is a comprehensive loss table which shows or includes a loss value for each possible data subcarrier constellation size (e.g., 0, 4, 6, 7, 8, 9, 10, 11, 12) and for a fine grid of RxMER values (such as stepping 0.05 dB, just as an example). In some implementations, given a constellation size $BL_m$ and an RxMER value $RxMER_m$, the system can identify or obtain a loss value $LV_m$ by looking up the loss table using the constellation size $BL_m$ and the RxMER value $RxMER_m$.

In some implementations, a complementary value of Loss_Target (referred to as "complement target value" denoted by "Complement_Target") can be defined as follows:

$$\text{Complement\_Target} = 1 - \text{Loss\_Target}, \quad \text{(Equation 4)}$$

where each of Loss_Target and Complement_Target can have a value between 0 and 1. For example, Loss_Target is 0.015 and Complement_Target is 0.985.

In some implementations, the system can assign a loss value $LV_m$ and/or a complement value $CV_m$ for each data subcarrier depending on (1) that subcarrier's bit loading profile (e.g., constellation size or density $BL_m$) and/or (2) that subcarrier's RxMER value $RxMER_m$. In some implementations, the system can assign a loss value $LV_m$ and/or a complement value $CV_m$ for each data subcarrier using the loss table.

For $m^{th}$ subcarrier of n subcarriers in an OFDM channel ($1 \le m \le n$; m, n are integers), $CV\_add_m$ denotes a complement value when the $m^{th}$ subcarrier has an increase in its bit loading by one (e.g., when the constellation size becomes $BL_m+1$). $CV\_delta\_add_m$ denotes an increase in the complement value of the $m^{th}$ subcarrier when the $m^{th}$ subcarrier has an increase in its bit loading by one (e.g., when the constellation size becomes $BL_m+1$) as follows:

$$CV\_delta\_add_m = CV\_add_m - CV_m \quad \text{(Equation 5)}$$

Similarly, For $m^{th}$ subcarrier of n subcarriers in an OFDM channel ($1 \le m \le n$; m, n are integers), $CV\_sub_m$ denotes a complement value when the $m^{th}$ subcarrier has a decrease in its bit loading by one (e.g., when the constellation size becomes $BL_m-1$). $CV\_delta\_sub_m$ denotes a decrease in the complement value of the $m^{th}$ subcarrier when the $m^{th}$ subcarrier has a decrease in its bit loading by one (e.g., when the constellation size becomes $BL_m-1$) as follows:

$$CV\_delta\_sub_m = CV\_sub_m - CV_m \quad \text{(Equation 6)}$$

$CV\_delta\_sub_m$ can be a negative value.

In some implementations, a system (e.g., cable modem or a server) can perform a first process for optimizing bit loading profiles for high net bit rate of cable modems as follows. In some implementations, the first process can implement a recursive algorithm for synthesizing optimal bit loading for a given RxMER vector. In some implementations, at (process) step 1-1, the system can receive input data for n subcarriers in an OFDM channel ($1 \le n$; n is an integer) at a cable modem. In some implementations, for $m^{th}$ subcarrier of n subcarriers in the OFDM channel ($1 \le m \le n$; m, n are integers), the input data can include an RxMER vector including $RxMER_m$ ($1 \le m \le n$), a plurality of constellation sizes $BL_m$, and/or Loss_Target. In some implementations, each constellation size $BL_m$ can take on all integers from 0 and above. In some implementations, the first process can start with any bit loading (e.g., any $BL_m$) over the set of all data subcarriers (e.g., n subcarriers; $1 \le m \le n$; m, n are integers).

In some implementations, at step 1-2, the system can calculate a plurality of loss values $LV_m$, a plurality of complement values $CV_m$, and/or a loss value per bit (denoted by "Loss_per_bit"). In some implementations, the system can identify, obtain or find the plurality of loss values $LV_m$ by looking up the loss table using the constellation size $BL_m$ and the RxMER value $RxMER_m$. In some implementations, the system can calculate the plurality of complement values $CV_m$ based on the (corresponding) plurality of loss values $LV_m$ using Equation 1. In order to calculate Loss_per_bit, the system can calculate a total bit loading of the data subcarriers of the OFDM channel (denoted by "Total_BL") using Equation 7 below, calculate a total complement value (denoted by "Total_CV") using Equation 8 below, and calculate a complement value per bit (denoted by "CV_per_bit") using Equation 9 below.

$$\text{Total\_BL} = \sum\nolimits_{m=1}^{n} BL_m \quad \text{(Equation 7)}$$

$$\text{Total\_CV} = \sum\nolimits_{m=1}^{n} CV_m \quad \text{(Equation 8)}$$

$$\text{CV\_per\_bit} = \frac{\text{Total\_CV}}{\text{Total\_BL}} \quad \text{(Equation 9)}$$

This ratio CV_per_bit can represent a complement value per bit for the OFDM channel with a particular bit loading (e.g., $BL_m$) and a particular RxMER vector (e.g., $RxMER_m$).

The system can calculate Loss_per_bit as follows:

$$\text{Loss\_per\_bit} = 1 - \text{CV\_per\_bit} \quad \text{(Equation 10)}$$

In some implementations, at step 1-3, the system can determine whether Loss_per_bit is greater than Loss_Target. At step 1-4, in response to determining that Loss_per_bit is greater than Loss_Target (Loss_per_bit>Loss_Target), the system can identify, find, or obtain a subcarrier with a maximum value of CV_delta_sub (e.g., the least negative value) when the subcarrier has a decrease in its bit loading by one. In other words, the system can identify, find, or obtain an index m such that $CV\_delta\_sub_m$ (typically is negative and calculated using Equation 6) is a maximum value (e.g., the least negative value) over all n subcarriers. At step 1-5, the system can subtract one bit from the constellation size $BL_m$ of the identified subcarrier (e.g., $m^{th}$ subcarrier) as follows:

$$BL_m = BL_m - 1 \quad \text{(Equation 11)}$$

In this manner, as the first process continues, the maximum value of CV_delta_sub may become lower and lower (e.g., more and more negative). Subsequently, the system can proceed to step 1-2 to perform the next iteration.

In some implementations, at step 1-6, in response to determining that Loss_per_bit is less than or equal to Loss_Target (Loss_per_bit≤Loss_Target), the system can identify, find, or obtain a subcarrier with a maximum increase in a complement value (e.g., CV_delta_add) when the subcarrier has an increase in its bit loading by one. In other words, the system can identify, find, or obtain an index m such that $CV\_delta\_add_m$ (calculated using Equation 5) is a maximum value over all n subcarriers. At step 1-7, the system can add one bit to the constellation size $BL_m$ of the identified subcarrier (e.g., $m^{th}$ subcarrier) as follows:

$$BL_m = BL_m + 1 \quad \text{(Equation 12)}$$

In some implementations, at step 1-8, the system can determine whether a stop condition is satisfied. For example, the step condition can include (1) the same subcarrier (e.g., same m) has been found on successive recursions or iterations (e.g., the same m has been found in the current iteration and the previous iteration) and (2) the test result in step 1-3 has been changed from (Loss_per_bit>Loss_Target) to (Loss_per_bit≤Loss_Target) in the two successive recursions (e.g., (Loss_per_bit≤Loss_Target) in the current iteration while (Loss_per_bit>Loss_Target) in the previous iteration). In response to determining that the stop condition is not satisfied (e.g., the same subcarrier has not been found on successive iterations; or the test result in step 1-3 has not been changed), the system can proceed to step 1-2 to perform the next iteration.

In some implementations, at step 1-9, in response to determining that the stop condition is satisfied (e.g., the same subcarrier has not been found on successive iterations; and the test result in step 1-3 has been changed from (Loss_per_bit>Loss_Target) to (Loss_per_bit≤Loss_Target) in the two successive recursions), the system can subtract one bit from the constellation size $BL_m$ of the identified subcarrier (e.g., $m^{th}$ subcarrier) using Equation 11. The system can perform step 1-9 to provide that Loss_per_bit≤Loss_Target. At step 1-10, the system can complete the first process.

In some implementations, a system (e.g., cable modem or a server) can perform a second process for optimizing bit loading profiles for high net bit rate of cable modems. The second process can implement a one-step algorithm for synthesizing an optimal bit loading for a given RxMER vector which can be more efficient than a recursive algorithm (e.g., the first process). At (process) step 2-1, the system can receive input data for n subcarriers in an OFDM channel (1≤n; n is an integer) at a cable modem. In some implementations, for $m^{th}$ subcarrier of n subcarriers in the OFDM channel (1≤m≤n; m, n are integers), the input data can include Loss_Target sand/or an RxMER vector including $RxMER_m$ (1≤m≤n), a plurality of constellation sizes $BL_m$, In some implementations, each constellation size $BL_m$ can take on all integers from 0 and above. In some implementations, at step 2-2, the system can calculate Complement_Target using Equation 4.

In some implementations, $CV\_per\_bit_m$ denotes a complement value per bit for $m^{th}$ subcarrier of n subcarriers in the OFDM channel with a bit loading (e.g., $BL_m$) and a RxMER vector (e.g., $RxMER_m$) corresponding to $m^{th}$ subcarrier. The system can calculate $CV\_per\_bit_m$ as follows:

$$\text{CV\_per\_bit}_m = \frac{CV_m}{BL_m} \quad \text{(Equation 13)}$$

In some implementations, at step 2-3, for each subcarrier (e.g., $m^{th}$ subcarrier), the system can generate an initial bit loading $BL_m$ by assigning a maximum constellation size that maintains $CV\_per\_bit_m$ (see Equation 13) to be greater than equal to Complement_Target. For example, for each subcarrier (e.g., $m^{th}$ subcarrier), the system can assign the constellation size $BL_m$ as large as possible while maintaining the $CV\_per\_bit_m$ of the subcarrier at or above the Complement_Target. Thus, with the initial bit loading $BL_m$ (m=1, . . . , n), adding another bit to any subcarrier's bit loading $BL_m$ can cause that subcarrier's $CV\_per\_bit_m$ to be below Complement_Target. In other words, the initial bit loading $BL_m$ (m=1, . . . , n) can meet (1) each $CV\_per\_bit_m$>Complement_Target and (2) CV_per_bit (e.g., complement values averaged over the entire constellation)>Complement_Target.

In some implementations, at step 2-4, the system can calculate CV_per_bit based on the current loading $BL_m$ (m=1, . . . , n) using Equation 9. At step 2-5, the system can determine whether CV_per_bit equals Complement_Target. At step 2-6, in response to determining that CV_per_bit does not equal Complement_Target, the system can proceed to step 2-6. In response to determining that CV_per_bit equals Complement_Target, the system can complete the second process at step 2-11.

In some implementations, at step 2-7, in response to determining that CV_per_bit is greater than Complement_Target, the system can identify, find, or obtain a subcarrier with a maximum increase in a complement value (e.g., CV_delta_add) when the subcarrier has an increase in its bit loading by one. In other words, the system can identify, find, or obtain an index m such that CV_delta_add$_m$ (calculated using Equation 5) is a maximum value over all n subcarriers. At step 2-8, the system can add one bit to the constellation size BL$_m$ of the identified subcarrier (e.g., m$^{th}$ subcarrier) using Equation 12. In this manner, Total_CV can increase with the added bit, while CV_per_bit$_m$ can decrease and thus CV_per_bit can decrease. Subsequently, the system can proceed to step 2-4 for the next iteration.

In some implementations, at step 2-9, in response to determining that CV_per_bit is less than Complement_Target, the system can identify, find, or obtain the subcarrier to which one bit has been added to (at step 2-8) in the previous iteration. At step 2-10, the system can subtract or drop one bit from the constellation size of the identified subcarrier, and proceed to step 2-11. In this manner, Total_CV can decrease with the dropped bit, while CV_per_bit$_m$ can increase and thus CV_per_bit can increase. At step 2-11, the system can complete the second process.

In some implementations, a system (e.g., cable modem or a server) can perform a third process for optimizing bit loading profiles for high net bit rate of cable modems. The third process can implement an enhanced one-step algorithm for synthesizing an optimal bit loading for a given RxMER vector. The third process can be more efficient than the algorithms implemented in the first process or the second process because such a full recursion or iteration (e.g., steps 1-3 to 1-8, steps 2-4 to 2-10) is not necessary. At (process) step 3-1, the system can receive input data for n subcarriers in an OFDM channel ($1 \le n$; n is an integer) at a cable modem. In some implementations, for m$^{th}$ subcarrier of n subcarriers in the OFDM channel ($1 \le m \le n$; m, n are integers), the input data can include Loss_Target sand/or an RxMER vector including RxMER$_m$ ($1 \le m \le n$), a plurality of constellation sizes BL$_m$, In some implementations, each constellation size BL$_m$ can take on all integers from 0 and above. In some implementations, at step 3-2, the system can calculate Complement_Target using Equation 4.

In some implementations, at step 3-3, for each subcarrier (e.g., m$^{th}$ subcarrier), the system can generate an initial bit loading BL$_m$ by assigning a maximum constellation size that maintains CV_per_bit$_m$ (see Equation 13) to be greater than equal to Complement_Target. For example, for each subcarrier (e.g., m$^{th}$ subcarrier), the system can assign the constellation size BL$_m$ as large as possible while maintaining the CV_per_bit$_m$ of the subcarrier at or above the Complement_Target. Thus, with the initial bit loading BL$_m$ (m=1, . . . , n), adding another bit to any subcarrier's bit loading BL$_m$ can cause that subcarrier's CV_per_bit$_m$ to be below Complement_Target. In other words, the initial bit loading BL$_m$ (m=1, . . . , n) can meet (1) each CV_per_bit$_m$>Complement_Target and (2) CV_per_bit (e.g., complement values averaged over the entire constellation)>Complement_Target.

In some implementations, at step 3-4, the system can calculate CV_delta_add$_m$ (m=1, . . . , n) using Equation 5 and order or rank n subcarriers in the decreasing order of CV_delta_add$_k$ (k=1, . . . , n) such that CV_delta_add$_{k=1}$ has the largest value and CV_delta_add$_{k=1}$ has the smallest value. At step 3-5, the system can calculate a surplus value (denoted by "Surplus") which is an excess amount of complement value of the entire channel (e.g., n subcarriers) above Complement_Target, as follows:

$$\text{Surplus} = \text{Total\_CV} - (\text{Total\_BL} \times \text{Complement\_Target}) \quad \text{(Equation 14)}$$

In some implementations, at step 3-6, for each subcarrier k=1, 2, . . . , the system can calculate, based on the ordered list of subcarriers with CV_delta_add$_k$ (k=1, . . . , n), an excess amount of complement value until k$^{th}$ subcarrier (denoted by "Surplus$_{1_to_k}$") as follows:

$$\text{Surplus}_{1\_to\_k} = \sum_{i=1}^{k} (\text{Complement\_Target} - \text{CV\_delta\_add\_i}) \quad \text{(Equation 15)}$$

Subsequently, the system can determine, find, or identify a largest k=k$_{max}$ such that Surplus$_{1_to_k}$ is less than or equal to Surplus as follows:

$$\text{Surplus}_{1\_to\_k} = \sum_{i=1}^{k} (\text{Complement\_Target} - \text{CV\_delta\_add\_i}) \le \text{Surplus} \quad \text{(Inequality 1)}$$

In some implementations, at step 3-7, for k$^{th}$ subcarrier (k=1, . . . , k$_{max}$) on the ordered list of subcarriers with CV_delta_add$_k$, the system can add one bit to the constellation size BL$_m$.

In some implementations, the system can add one bit to the constellation size BL$_k$ (k=1, 2, . . . ) until Surplus$_{1_to_k}$ is greater than Surplus as follows:

$$\text{Surplus}_{1\_to\_k} = \sum_{i=1}^{k} (\text{Complement\_Target} - \text{CV\_delta\_add\_i}) > \text{Surplus} \quad \text{(Inequality 2)}$$

The third process can find the number of subcarriers in which one bit is added to the initial bit loading (e.g., k$_{max}$ when using Inequality 1, or (k−1) when using Inequality 2) to achieve the optimal bit loading (in terms of net bit rate). It is noted that using the initial bit loading (e.g., the bit loading calculated in step 2-3 or step 3-3) can put a constraint that more than 1 bit should not be added to any subcarrier. This constraint can simplify the algorithm (e.g., the second process and the third process) compared to an algorithm without computing the initial bit loading (e.g., the first process).

In some implementations, the system can make adjustments to the one-step algorithm (e.g., the second process or the third process) for constraints in the constellation size. Such constraints can include (1) a constraint that all cable modems should have a finite limit on the maximum constellation size; (2) a constraint that that constellation sizes of 1, 2, 3, and 5 are not required (i.e., not available); (3) a constraint that some CMTS do not have ability to program all data subcarriers in an OFDM channel with their own bit loading; and/or (4) a constraint that there exists severely mismatched bit loading versus RxMER on a number of data subcarriers, which is unique to the DOCSIS OFDM and FEC. The constraint (2) may be applied to the DOCSIS OFDM cable modem because constellation sizes of 1, 2, 3, and 5 are not required in the DOCSIS OFDM specification.

Regarding the constraint (1), the one-step algorithm described above (e.g., the second process or the third process) can yield, generate, obtain, identify, or find the optimal bit loading for any RxMER vector and a cable modem with constellation size which can be any non-negative integer. Clearly, however, it is not possible for an implementation of a cable modem to have constellation sizes which range over all non-negative integer sizes. All feasible cable modems can have a finite limit on the maximum constellation size, and this may impose some additional considerations into the one-step algorithm described above. These considerations are described below.

One impact for the constraint of a maximum constellation size may be results when there are some subcarriers with very high RxMER (e.g., RxMER values are so large that the value of CV_per_bit for the subcarriers is much larger than Complement_Target even with the maximum constellation size). If there exist such subcarriers, then these subcarriers can add more to the surplus complement value (e.g., Surplus) than is possible in the initial bit loading with the unconstrained constellation size. To address this, the system can make adjustments to the one-step algorithm such that subcarriers with lower RxMER are able to add more than just one bit to their constellation size assigned in the initial bit loading. In this manner, it is possible that some subcarriers can increase by more than one bit from the initial bit loading. These subcarriers may have their CV_per_bit fall below Complement_Target, but the system has so much Surplus, that the CV per bit for the entire OFDM channel remains above Complement Target, even with some subcarriers adding more than one bit, or even two, and these subcarriers having their CV per bit fall significantly below the Complement Target. The system can make adjustments to allow some of the subcarriers to add additional bits. This adjustment can maintain the overall surplus of Total_CV above Complement_Target, because of the large CV_per_bit in the subcarriers that are "maxed out" in constellation size with very large RxMER. It is also noted that even with this surplus of Complement_Target, some subcarriers may not increase their bit loading, even while other subcarriers increase their bit loading by adding more than one bit. For example, the system can make adjustments to the one-step algorithm such that in cases where one or more subcarriers have an initial bit loading at a maximum constellation size, subcarriers with an initial bit loading smaller than the constellation size of maximum-minus-one can have additional entries into the ranking for the one-step algorithm (e.g., the ranking as a result of ordering subcarriers in step 3-4). In some implementations, the system can make adjustments to the one-step algorithm with this constraint to add a second bit, and even a third bit to the constellation size for such subcarriers (e.g., subcarriers with an initial bit loading smaller than the constellation size of maximum-minus-one). This is an implementation detail facilitating the efficient computation of where to add the possible additional bits, when some subcarriers have their bit loading "maxed out" due to constraint 1).

Regarding the constraint (2) that for the DOCSIS OFDM cable modems, constellation sizes of 1, 2, 3, and 5 are not required in the specification, and because of these "skips" in the possible constellation size, the system needs to make adjustments in the one-step algorithm. With skipped constellation sizes, after the initial bit loading, the ranking of the subcarriers (e.g., the ranking as a result of ordering subcarriers in step 3-4) that are just below the "skipped" constellation sizes, e.g., 4 in DOCSIS (since there is no 5) needs to be adjusted for entry in the table and ranking. For example, if the constellation size of a subcarrier is 4, the value of the increase in CV_delta_add cannot be computed as described for the one-step algorithm above, because that requires adding a single bit to have the constellation size of 5 which is not available. To address this problem, In some implementations, the system can make adjustment to compute the "CV delta" that occurs with the addition of two bits to the constellation of size 4, and then dividing this by two, creating (effectively) two subcarriers with an identical CV_delta_add and together the two entries can provide the total increase in complement values which can occur when that subcarrier gets two more bits. In some implementations, in the one-step process (e.g., the second process or the third process), the two identical "single bit" subcarrier entries can be operated together, since they have the same CV_delta_add values. The only remaining problem then, is if the addition of one of these bits keeps the surplus positive (or zero), but the addition of the second such bit causes the surplus to drop below zero. In this case, in some implementations, this subcarrier (e.g., subcarrier with constellation size 4) cannot be increased to 6. Instead, in this case, this subcarrier can be left unchanged at 4 bits constellation size, and the next subcarrier in the ranking can be examined to check if the next subcarrier can add another bit and keep the surplus from going negative.

Regarding the constraint (3), some CMTS's are constrained in their ability to program all data subcarriers in an OFDM channel with their own bit loading. As such, the synthesis of the optimal bit loading profile for a cable modem operating with such CMTS may ignore the constraint (since one application is to use the net bit rate as a figure of merit, it may be thought best to have the unconstrained net bit rate, even though with this CMTS it would not be possible to provide own bit loading for different subcarriers). However, if the synthesis of the optimal bit loading for the cable modem is desired to incorporate the constrained CMTS, the system can make adjustment for the synthesis algorithm as described in the following.

In some embodiments, a CMTS is limited such that the CMTS can provide one bit loading for each segment of 8 consecutively enumerated data subcarriers. In some embodiments, one segment can have fewer than 8 subcarriers. In some embodiments, a synthesized optimized bit loading profile can be created with this constraint applying. Each segment of subcarriers can be constrained to have the same bit loading value such that the subcarriers increment or decrement the bit loading in unison. In some implementations, for a given bit loading value for a segment, the system can calculate or compute CV_delta_add of each segment (e.g., by summing CV_delta_add over all subcarriers in the segment) and divide CV_delta_add by the number of subcarriers in the segment. For example, the system can compute an average CV_delta_add of each segment to provide the CV_delta_add that occurs for each bit added for the segment. In some implementations, the system can treat the collection of 8 subcarriers just like a subcarrier with a constellation that has eight bits less than the next highest constellation. The system can calculate or compute the CV_delta_add as instructed for each subcarrier using each subcarrier's RxMER. The system can sum the results (e.g., CV_delta_add of each subcarrier), and then divide the sum of the results (e.g., a sum of CV_delta_add of each subcarrier) by the number of subcarriers (averaged). This can result in a CV_delta_add that corresponds to the CV_delta associated with a single bit addition. For example, if the constellation step size is two bits for the segment, then the system can treat as if the constellation step was 16 bits (e.g., two bits each times the 8 subcarriers in the segment). Other than these adjustments, the system can execute or operate the synthesis algorithm in the same manner as described above (e.g., the first process, the second process, or the third process).

Embodiments in the present disclosure have at least the following advantages and benefits. Embodiments in the present disclosure can provide useful techniques for performing a synthesis of an optimal bit loading profile for OFDM. A system according to some implementations can provide, as a result of the synthesis of the optimal bit loading profile, (1) a metric for assessing the "health" of a cable modem and comparing the metric to the own history of the cable modem and to a metric of other cable modems; and (2) a solution (e.g., a result bit loading profile) for achieving the highest bit rate possible for the cable modem given its current SNR (e.g., an RxMER vector) across the OFDM channel. Thus, the system can not only provide a useful health/status monitor for each cable modem, but also can provide a solution for achieving the highest bit loading profile possible for the cable modem given its current RxMER status in the OFDM channel. In some implementations, for any RxMER vector in a trial scenario, the system can synthesize an optimal bit loading profile for such a trial scenario.

Referring to FIGS. 3A-8, embodiments of systems and methods for the present solution to estimate or identify SNR margins are described and illustrated.

Figure 3A:
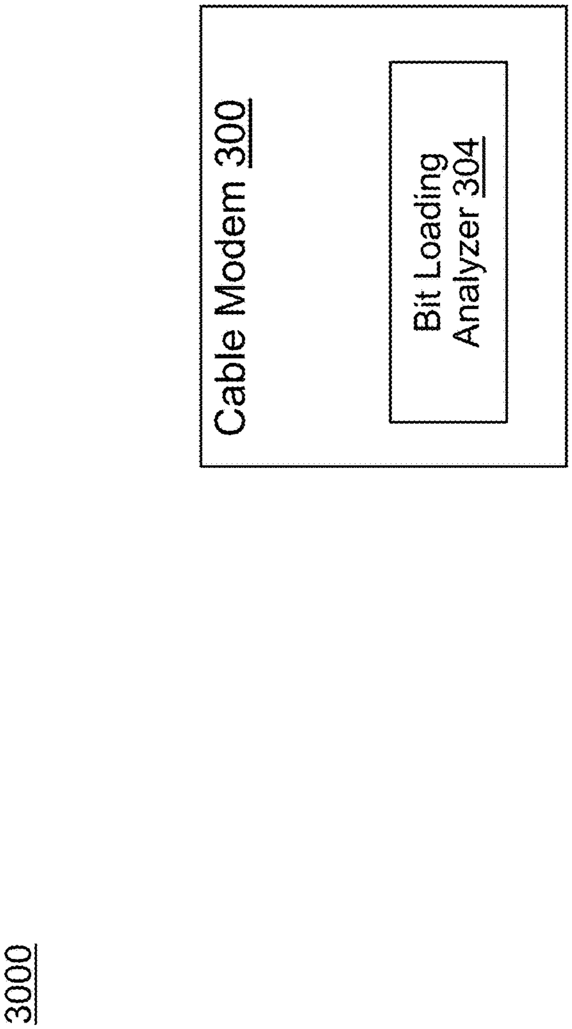
FIG. 3A and FIG. 3B are diagrams depicting an example communication environment with one or more cable modems and a server for optimizing bit loading profiles for high net bit rate of cable modems, according to one or more embodiments.
Figure 3B:
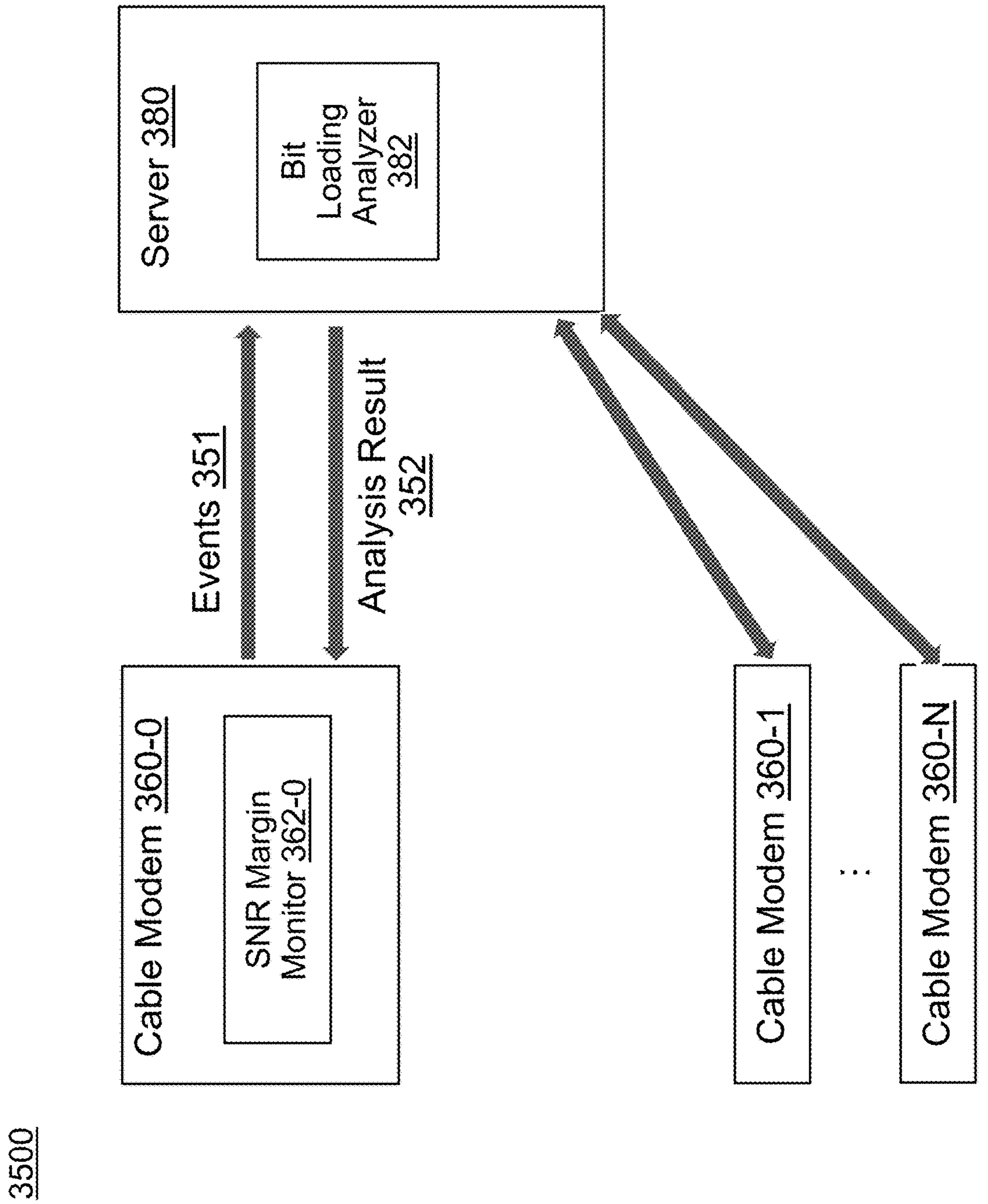

FIG. 3A and FIG. 3B are diagrams depicting an example communication environment with one or more cable modems and a server for optimizing bit loading profiles for high net bit rate of cable modems, according to one or more embodiments.

Referring to FIG. 3A, a communication environment 3000 may include a cable modem 300 for performing a synthesis and/or analysis of a bit loading profile. The cable modem 300 can have configuration similar to configuration of computing system 2000. The cable modem 300 can include a bit loading analyzer 304. The bit loading analyzer 304 can be implemented in hardware (e.g., circuitry or processor), firmware, software, or a combination thereof. The bit loading analyzer 304 can perform a synthesis and/or analysis of bit loading for the cable modem 300, and output a result of the synthesis and/or analysis (e.g., identify, generate, synthesize or calculate an optimal bit loading profile). The optimal bit loading profile can include constellation sizes or constellation densities corresponding to a plurality of data subcarriers of an OFDM channel in the cable modem. The cable modem 300 can use the optimal bit loading profile to set constellation sizes for QAM modulation. The cable modem 300 can perform demodulation using the optimal bit loading profile.

Referring to FIG. 3B, a communication environment 3500 may include a plurality of cable modems 360-0, 360-1, . . . , 360-N and a server 380 for performing a synthesis and/or analysis of a bit loading profile. Each of the plurality of cable modems 360-0, 360-1, . . . , 360-N and the server 380 can have configuration similar to configuration of computing system 2000. The cable modem 360-0 (among the plurality of cable modems) can include an SNR margin monitor 362-0. The SNR margin monitor 362-0 can be implemented in hardware (e.g., circuitry or processor), firmware, software, or a combination thereof. The SNR margin monitor 362-0 can perform an SNR margin calculation or estimation, monitor SNR margin estimates, and detect or trigger an event 351 (e.g., an SNR margin value falls below or exceeds a threshold value, or a change of the SNR margin value lies outside the bounds). In response to detecting the event 351, the cable modem 360-0 can send the event 351 and/or related data (e.g., SNR margin data, RxMER data, etc.) to the server 380. In response to receiving the event 351, the server 380 can perform a synthesis and/or analysis of bit loading for the cable modem 360-0, output a result 352 of the synthesis and/or analysis (e.g., identify, generate, synthesize or calculate an optimal bit loading profile), and send the result 352 of the analysis to the cable modem 360-0. In response to receiving the analysis result 352, the cable modem 360-0 can use the optimal bit loading profile to set constellation sizes for QAM modulation. The cable modem 360-0 can perform demodulation using the optimal bit loading profile. In some implementations, only some cable modems (e.g., only CM (cable modem) 0 and CM 1 among CM 0, . . . , CM N) can proactively send data back to the server 380 after triggering the events, thereby streamlining the bit loading profile analysis/synthesis process.

Figure 4:
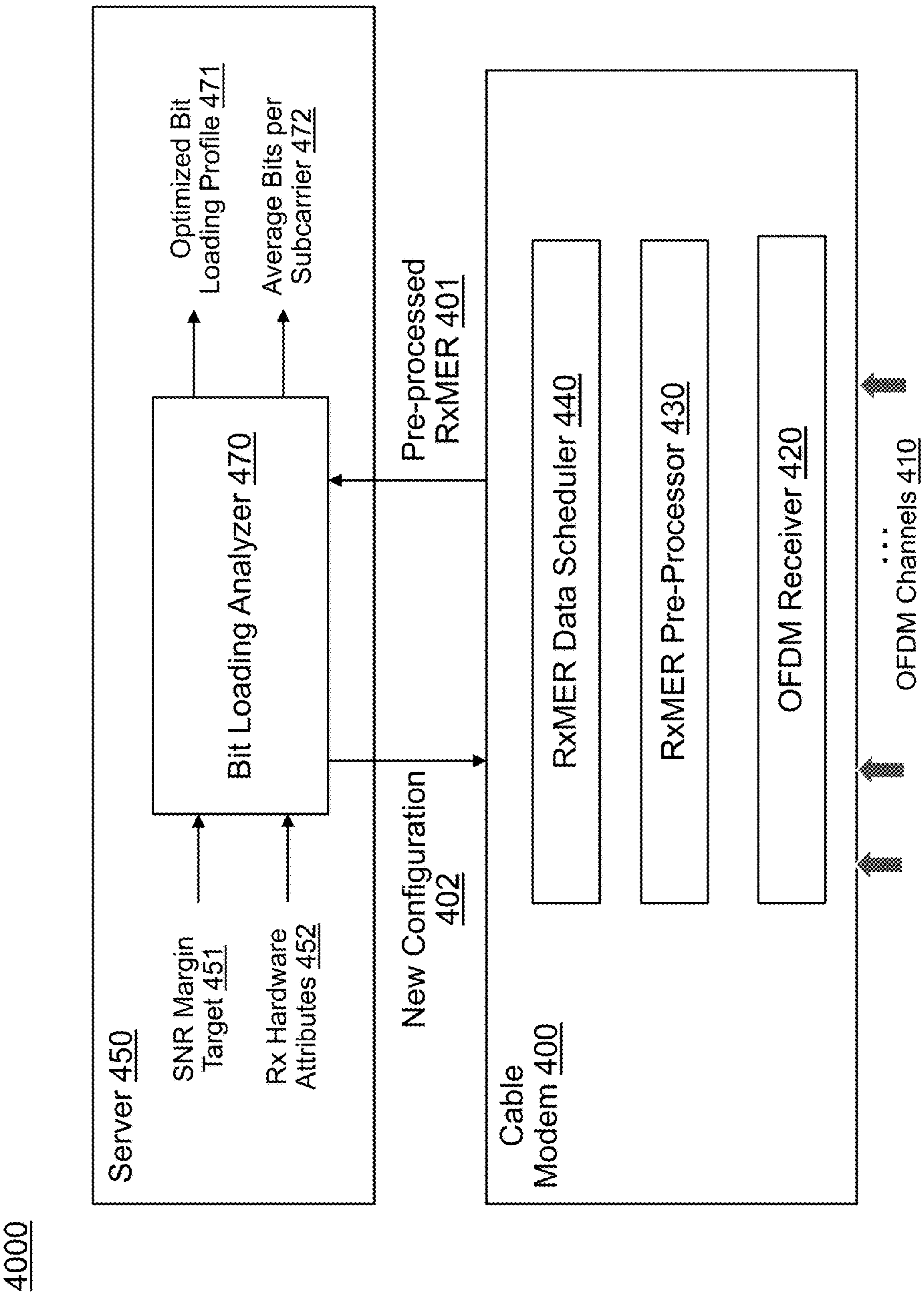
FIG. 4 is a diagram depicting an example communication environment with a cable modem and a server for optimizing bit loading profiles for high net bit rate of cable modems, according to one or more embodiments.

FIG. 4 is a diagram depicting an example communication environment 4000 with a cable modem 400 and a server 450 for optimizing bit loading profiles for high net bit rate of cable modems, according to one or more embodiments. Each of the cable modem 400 and the server 450 can have configuration similar to configuration of computing system 2000. The cable modem can include an OFDM receiver 420, an RxMER pre-processor 430 and/or an RxMER data scheduler 440. Each of the OFDM receiver 420, the RxMER pre-processor 430 and the RxMER data scheduler 440 can be implemented in hardware (e.g., circuitry or processor), firmware, software, or a combination thereof. The OFDM receiver 420 can receive traffic through a plurality of OFDM channels 410, each channel including a plurality of subcarriers. The RxMER pre-processor 430 can receive and pre-process demodulation data and output RxMER values. Each of the RxMER values can correspond to a subcarrier of the plurality of subcarriers. The RxMER data scheduler 440 can send pre-processed RxMER values 401 to the server 450 periodically or upon events (e.g., an SNR margin value falls below or exceeds a threshold value, or a change of the SNR margin value lies outside the bounds) so that the server 450 can perform a synthesis or analysis of bit loading profiles using the pre-processed RxMER values 401.

Referring to FIG. 4, the server 450 can include a bit loading analyzer 470 which can be implemented in hardware (e.g., circuitry or processor), firmware, software, or a combination thereof. In response to receiving the pre-processed RxMER values 401 from the cable modem 400, the bit loading analyzer 470 can receive input data (e.g., SNR margin target 451, Rx hardware attributes 452), perform a synthesis and/or analysis of bit loading for the cable modem 400, output a result of the synthesis and/or analysis (e.g., a new modulation configuration 402 including an optimized bit loading profile 471, an average number of bits per subcarrier 472 and/or other parameters for modulation configuration), and send the new modulation configuration to the cable modem. In response to receiving the new modulation configuration 402, the cable modem 400 can use the optimal bit loading profile 471 to set constellation sizes for QAM modulation. The cable modem 400 can perform demodulation using the optimal bit loading profile 471.

Figure 5:
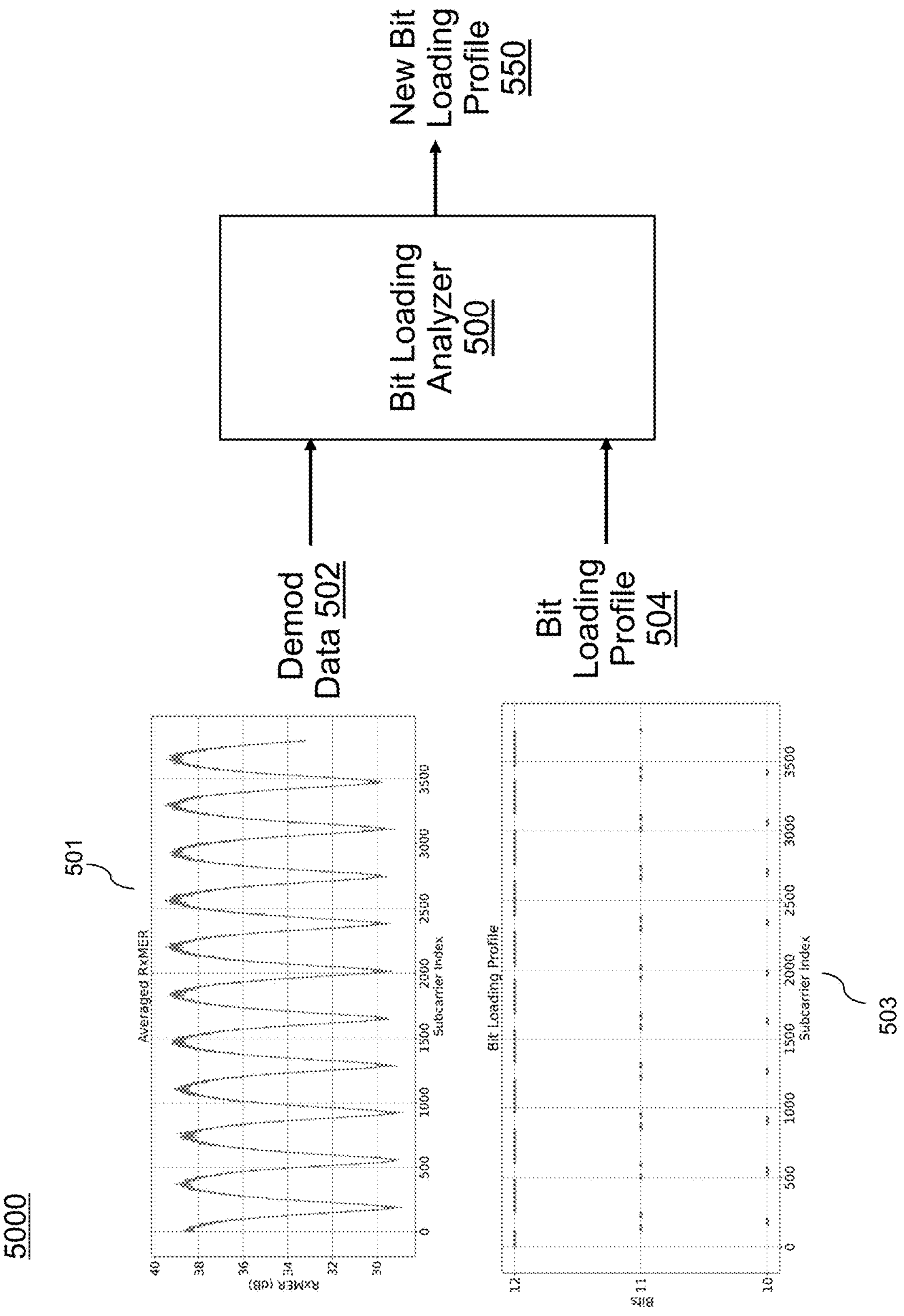
FIG. 5 is a diagram depicting an example bit loading analyzer, according to one or more embodiments.

FIG. 5 is a diagram 5000 depicting an example bit loading analyzer 500, according to one or more embodiments. A system (e.g., one or more cable modems 300, 360, 400, or a server 380, 450) can include a bit loading analyzer 500. The bit loading analyzer 500 can be implemented in hardware (e.g., circuitry or processor), firmware, software, or a combination thereof. The bit loading analyzer 500 can receive, as input data, demodulation data 502 (e.g., pre-processed demodulation data such as RxMER values 501) and/or a bit loading profile 504 (e.g., current bit loading profile 503) relating to a cable modem, perform a synthesis and/or analysis of bit loading for the cable modem, and output a new bit loading profile 550 for the cable modem.

Figure 6:
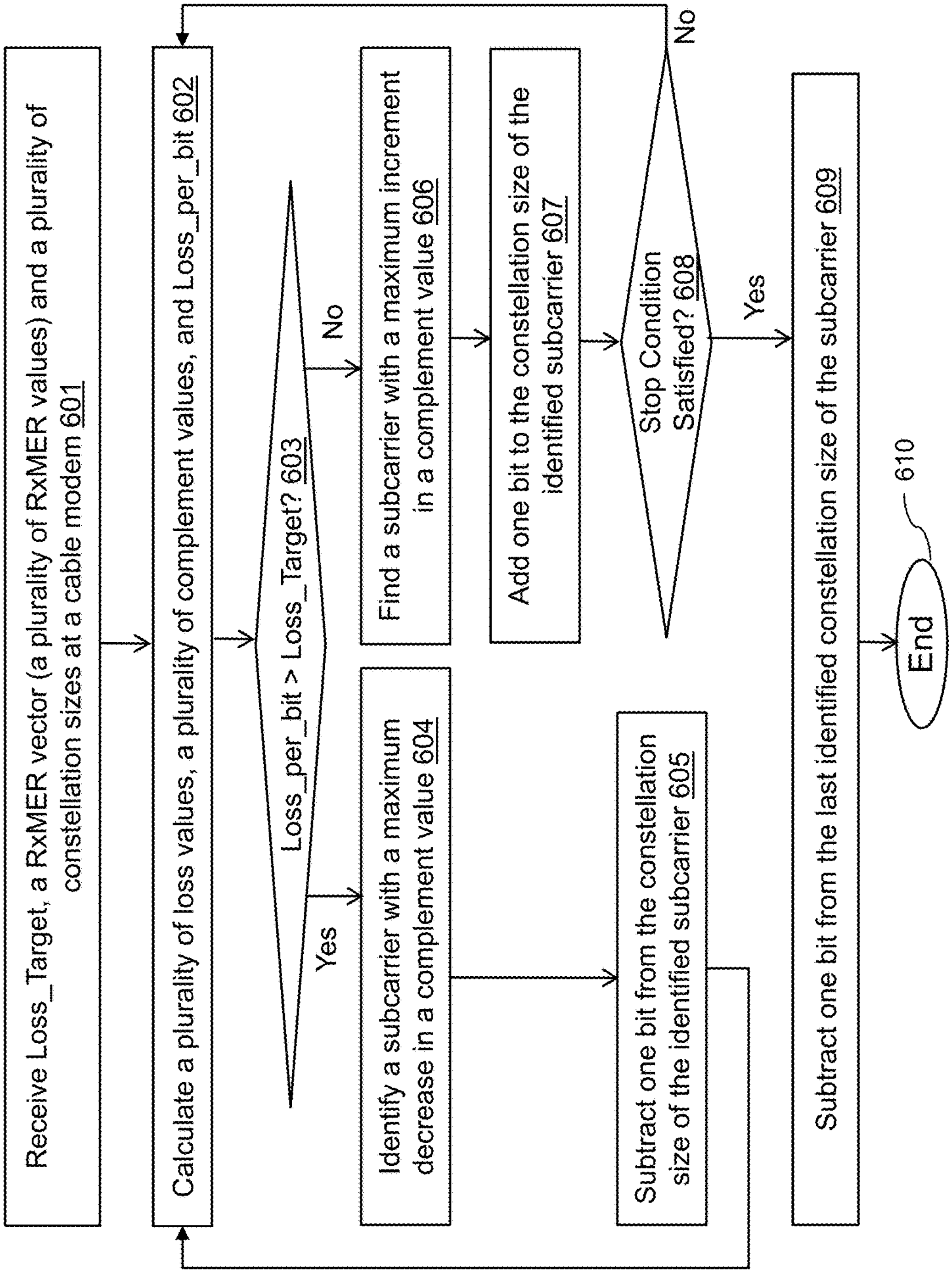
FIG. 6 is a flow diagram showing a process for optimizing bit loading profiles for high net bit rate of cable modems, in accordance with an embodiment.

FIG. 6 is a flow diagram showing a process 600 for optimizing bit loading profiles for high net bit rate of cable modems, in accordance with an embodiment. A system (e.g., one or more cable modems 300, 360, 400, or a server 380, 450) can perform the process 600 for optimizing bit loading profiles for high net bit rate of cable modems as follows. The process 600 can implement a recursive algorithm for synthesizing optimal bit loading for a given RxMER vector. At (process) step 601, the system can receive input data for n subcarriers in an OFDM channel ($1 \le n$; n is an integer) at a cable modem. For $m^{th}$ subcarrier of n subcarriers in the OFDM channel ($1 \le m \le n$; m, n are integers), the input data can include an RxMER vector including $RxMER_m$ ($1 \le m \le n$), a plurality of constellation sizes $BL_m$, and/or Loss_Target. Each constellation size $BL_m$ can take on all integers from 0 and above. The process 600 can start with any bit loading (e.g., any $BL_m$) over the set of all data subcarriers (e.g., n subcarriers; $1 \le m \le n$; m, n are integers).

At step 602, the system can calculate a plurality of loss values $LV_m$, a plurality of complement values $CV_m$, and/or Loss_per_bit. The system can identify, obtain or find the plurality of loss values $LV_m$ by looking up the loss table using the constellation size $BL_m$ and the RxMER value $RxMER_m$. The system can calculate the plurality of complement values $CV_m$ based on the (corresponding) plurality of loss values $LV_m$ using Equation 1. In order to calculate Loss_per_bit, the system can calculate Total_BL using Equation 7, calculate Total_CV using Equation 8, and calculate CV_per_bit using Equation 9. CV_per_bit can represent a complement value per bit for the OFDM channel with a particular bit loading (e.g., $BL_m$) and a particular RxMER vector (e.g., $RxMER_m$). The system can calculate Loss_per_bit using Equation 10.

At step 603, the system can determine whether Loss_per_bit is greater than Loss_Target. At step 604, in response to determining that Loss_per_bit is greater than Loss_Target (Loss_per_bit>Loss_Target), the system can identify, find, or obtain a subcarrier with a maximum value of CV_delta_sub (e.g., the least negative value) when the subcarrier has a decrease in its bit loading by one. In other words, the system can identify, find, or obtain an index m such that $CV\_delta\_sub_m$ (typically is negative and calculated using Equation 6) is a maximum value (e.g., the least negative value) over all n subcarriers. At step 605, the system can subtract one bit from the constellation size $BL_m$ of the identified subcarrier (e.g., $m^{th}$ subcarrier) using Equation 11. In this manner, as the process 600 continues, the maximum value of CV_delta_sub may become lower and lower (e.g., more and more negative). Subsequently, the system can proceed to step 602 to perform the next iteration.

At step 606, in response to determining that Loss_per_bit is less than or equal to Loss_Target (Loss_per_bit≤Loss_Target), the system can identify, find, or obtain a subcarrier with a maximum increase in a complement value (e.g., CV_delta_add) when the subcarrier has an increase in its bit loading by one. In other words, the system can identify, find, or obtain an index m such that $CV\_delta\_add_m$ (calculated using Equation 5) is a maximum value over all n subcarriers. At step 607, the system can add one bit to the constellation size $BL_m$ of the identified subcarrier (e.g., $m^{th}$ subcarrier) using Equation 12.

At step 608, the system can determine whether a stop condition is satisfied. For example, the step condition can include (1) the same subcarrier (e.g., same m) has been found on successive recursions or iterations (e.g., the same m has been found in the current iteration and the previous iteration) and (2) the test result in step 603 has been changed from (Loss_per_bit>Loss_Target) to (Loss_per_bit≤Loss_Target) in the two successive recursions (e.g., (Loss_per_bit≤Loss_Target) in the current iteration while (Loss_per_bit>Loss_Target) in the previous iteration). In response to determining that the stop condition is not satisfied (e.g., the same subcarrier has not been found on successive iterations; or the test result in step 603 has not been changed), the system can proceed to step 602 to perform the next iteration.

At step 609, in response to determining that the stop condition is satisfied (e.g., the same subcarrier has not been found on successive iterations; and the test result in step 603 has been changed from (Loss_per_bit>Loss_Target) to (Loss_per_bit≤Loss_Target) in the two successive recursions), the system can subtract one bit from the constellation size $BL_m$ of the identified subcarrier (e.g., $m^{th}$ subcarrier) using Equation 11. The system can perform step 609 to provide that Loss_per_bit≤Loss_Target. At step 610, the system can complete the process 600.

Figure 7A:
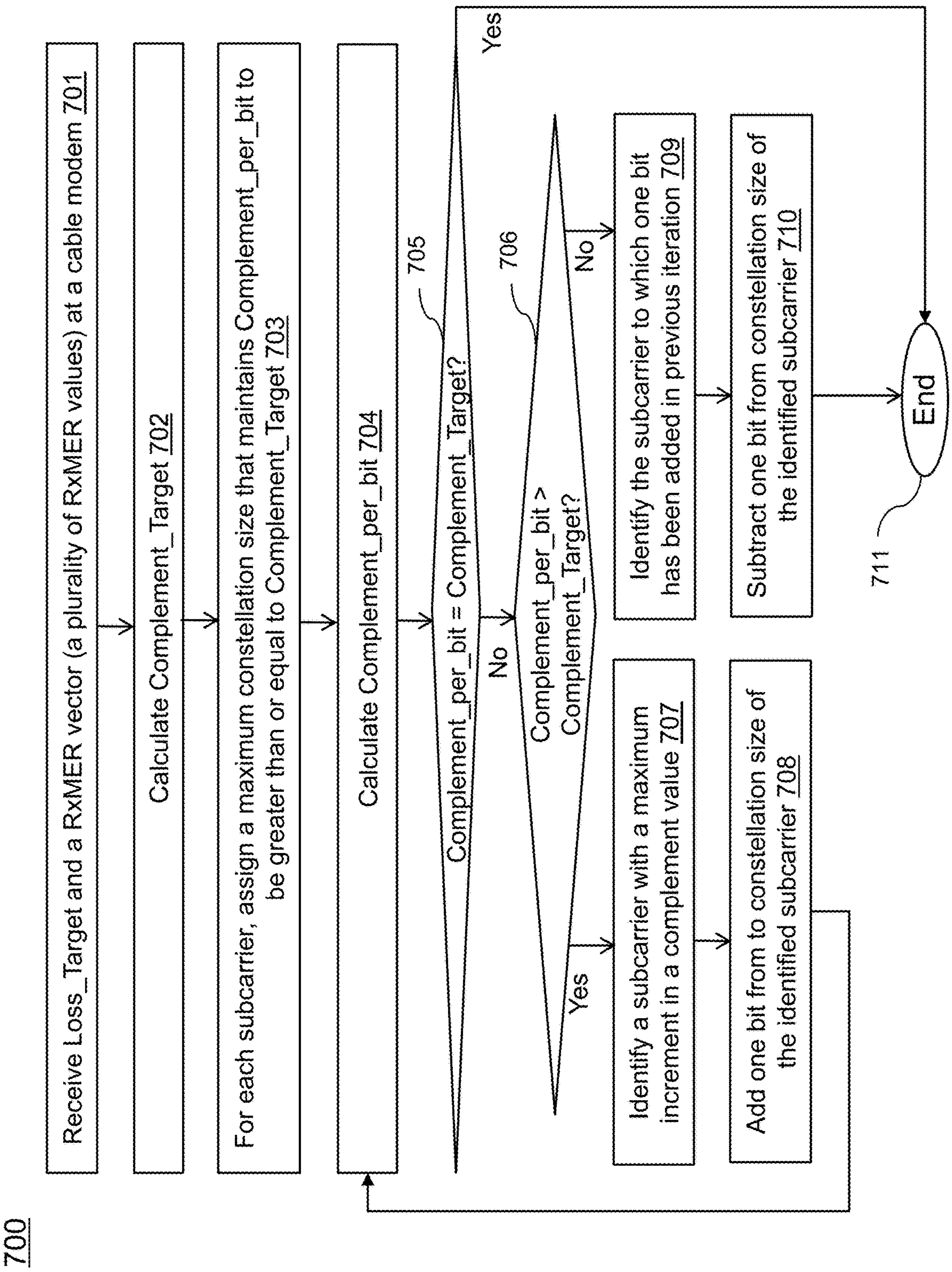
FIG. 7A and FIG. 7B are flow diagrams showing processes for optimizing bit loading profiles for high net bit rate of cable modems, in accordance with an embodiment, according to one or more embodiments.
Figure 7B:
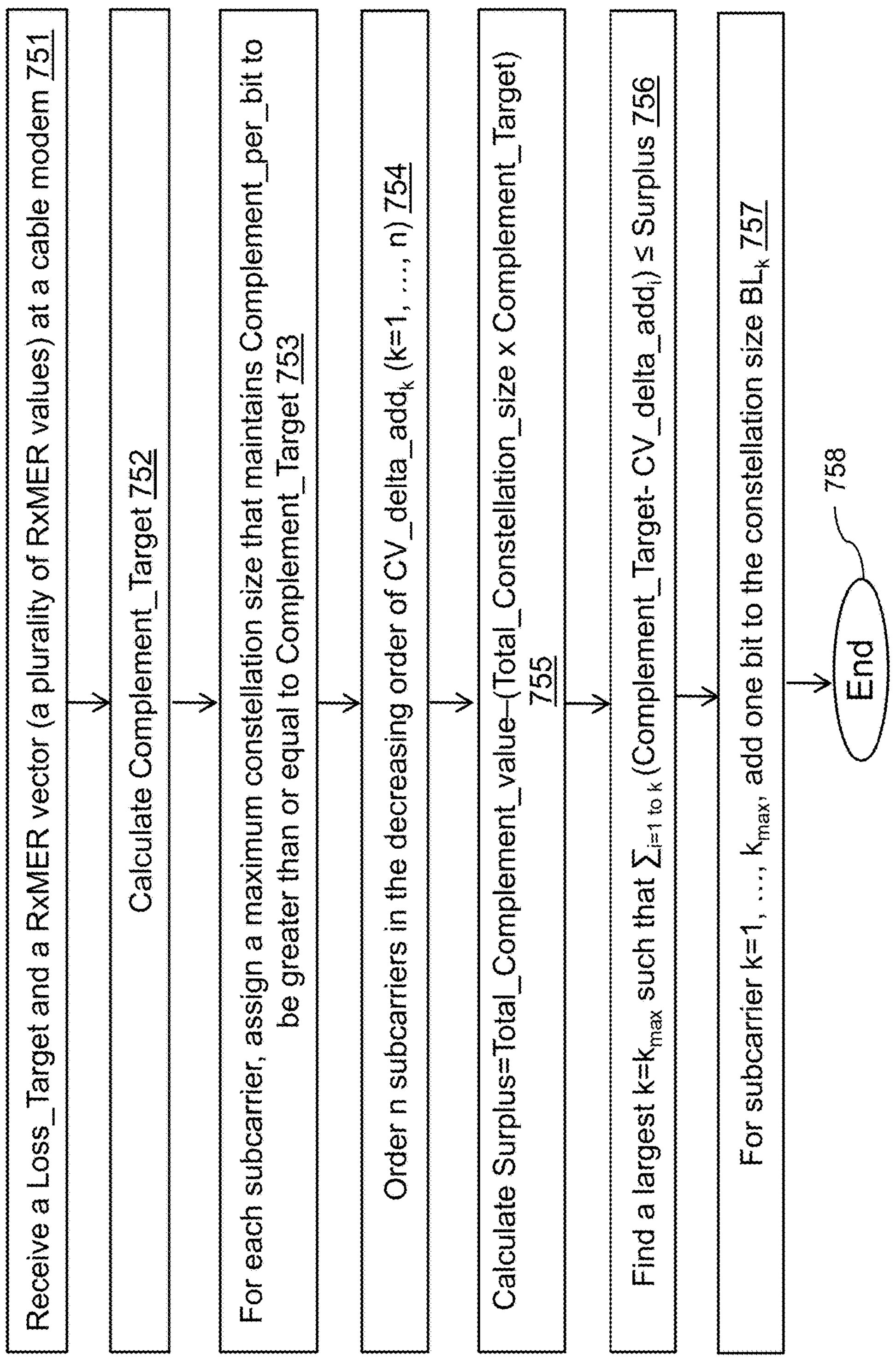

FIG. 7A and FIG. 7B are flow diagrams showing processes for optimizing bit loading profiles for high net bit rate of cable modems, in accordance with an embodiment, according to one or more embodiments. Referring to FIG. 7A, a system (e.g., one or more cable modems 300, 360, 400, or a server 380, 450) can perform a process 700 for optimizing bit loading profiles for high net bit rate of cable modems. The process 700 can implement a one-step algorithm for synthesizing an optimal bit loading for a given RxMER vector which can be more efficient than a recursive algorithm (e.g., the process 600). At (process) step 701, the system can receive input data for n subcarriers in an OFDM channel ($1 \le n$; n is an integer) at a cable modem. In some implementations, for $m^{th}$ subcarrier of n subcarriers in the OFDM channel ($1 \le m \le n$; m, n are integers), the input data can include Loss_Target sand/or an RxMER vector including $RxMER_m$ ($1 \le m \le n$), a plurality of constellation sizes $BL_m$, Each constellation size $BL_m$ can take on all integers from 0 and above. At step 702, the system can calculate Complement_Target using Equation 4.

At step 703, for each subcarrier (e.g., $m^{th}$ subcarrier), the system can generate an initial bit loading $BL_m$ by assigning a maximum constellation size that maintains $CV\_per\_bit_m$ (see Equation 13) to be greater than equal to Complement_Target. For example, for each subcarrier (e.g., $m^{th}$ subcarrier), the system can assign the constellation size $BL_m$ as large as possible while maintaining the $CV\_per\_bit_m$ of the subcarrier at or above the Complement_Target. Thus, with the initial bit loading $BL_m$ (m=1, . . . , n), adding another bit to any subcarrier's bit loading $BL_m$ can cause that subcarrier's $CV\_per\_bit_m$ to be below Complement_Target. In other words, the initial bit loading $BL_m$ (m=1, . . . , n) can meet (1) each $CV\_per\_bit_m$>Complement_Target and (2) CV_per_bit (e.g., complement values averaged over the entire constellation) Complement_Target.

At step 704, the system can calculate CV_per_bit based on the current loading $BL_m$ (m=1, . . . , n) using Equation 9.

At step 705, the system can determine whether CV_per_bit equals Complement_Target. At step 706, in response to determining that CV_per_bit does not equal Complement_Target, the system can proceed to step 706. In response to determining that CV_per_bit equals Complement_Target, the system can complete the process 700 at step 711.

At step 707, in response to determining that CV_per_bit is greater than Complement_Target, the system can identify, find, or obtain a subcarrier with a maximum increase in a complement value (e.g., CV_delta_add) when the subcarrier has an increase in its bit loading by one. In other words, the system can identify, find, or obtain an index m such that $CV\_delta\_add_m$ (calculated using Equation 5) is a maximum value over all n subcarriers. At step 708, the system can add one bit to the constellation size $BL_m$ of the identified subcarrier (e.g., $m^{th}$ subcarrier) using Equation 12. In this manner, Total_CV can increase with the added bit, while $CV\_per\_bit_m$ can decrease and thus CV_per_bit can decrease. Subsequently, the system can proceed to step 704 for the next iteration.

At step 709, in response to determining that CV_per_bit is less than Complement_Target, the system can identify, find, or obtain the subcarrier to which one bit has been added to (at step 708) in the previous iteration. At step 710, the system can subtract or drop one bit from the constellation size of the identified subcarrier, and proceed to step 711. In this manner, Total_CV can decrease with the dropped bit, while $CV\_per\_bit_m$ can increase and thus CV_per_bit can increase. At step 711, the system can complete the process 700.

Referring to FIG. 7B, a system (e.g., one or more cable modems 300, 360, 400, or a server 380, 450) can perform a process 750 for optimizing bit loading profiles for high net bit rate of cable modems. The process 750 can implement an enhanced one-step algorithm for synthesizing an optimal bit loading for a given RxMER vector. The process 750 can be more efficient than the algorithms implemented in the process 600 or the process 700 because such a full recursion or iteration (e.g., steps 603 to 608, steps 704 to 710) is not necessary. At (process) step 751, the system can receive input data for n subcarriers in an OFDM channel ($1 \le n$; n is an integer) at a cable modem. For $m^{th}$ subcarrier of n subcarriers in the OFDM channel ($1 \le m \le n$; m, n are integers), the input data can include Loss_Target sand/or an RxMER vector including $RxMER_m$ ($1 \le m \le n$), a plurality of constellation sizes $BL_m$, Each constellation size $BL_m$ can take on all integers from 0 and above. At step 752, the system can calculate Complement_Target using Equation 4.

At step 753, for each subcarrier (e.g., $m^{th}$ subcarrier), the system can generate an initial bit loading $BL_m$ by assigning a maximum constellation size that maintains $CV\_per\_bit_m$ (see Equation 13) to be greater than equal to Complement_Target. For example, for each subcarrier (e.g., $m^{th}$ subcarrier), the system can assign the constellation size $BL_m$ as large as possible while maintaining the $CV\_per\_bit_m$ of the subcarrier at or above the Complement_Target. Thus, with the initial bit loading $BL_m$ (m=1, . . . , n), adding another bit to any subcarrier's bit loading $BL_m$ can cause that subcarrier's $CV\_per\_bit_m$ to be below Complement_Target. In other words, the initial bit loading $BL_m$ (m=1, . . . , n) can meet (1) each $CV\_per\_bit_m$>Complement_Target and (2) CV_per_bit (e.g., complement values averaged over the entire constellation) Complement_Target.

At step 754, the system can calculate $CV\_delta\_add_m$ (m=1, . . . , n) using Equation 5 and order or rank n subcarriers in the decreasing order of $CV\_delta\_add_k$ (k=1, . . . , n) such that $CV\_delta\_add_{k=1}$ has the largest value and $CV\_delta\_add_{k=1}$ has the smallest value. At step 755, the system can calculate Surplus using Equation 14.

At step 756, for each subcarrier k=1, 2, . . . , the system can calculate, based on the ordered list of subcarriers with $CV\_delta\_add_k$ (k=1, . . . , n), $Surplus_{1\_to\_k}$ using Equation 15. Subsequently, the system can determine, find, or identify a largest $k=k_{max}$ such that $Surplus_{1\_to\_k}$ is less than or equal to Surplus, using Inequality 1. At step 757, for $k^{th}$ subcarrier (k=1, . . . , $k_{max}$) on the ordered list of subcarriers with $CV\_delta\_add_k$, the system can add one bit to the constellation size $BL_m$. Alternatively, the system can add one bit to the constellation size $BL_k$ (k=1, 2, . . . ) until $Surplus_{1\_to\_k}$ is greater than Surplus using Inequality 2.

The process 750 can find the number of subcarriers in which one bit is added to the initial bit loading (e.g., $k_{max}$ when using Inequality 1, or (k−1) when using Inequality 2) to achieve the optimal bit loading (in terms of net bit rate). It is noted that using the initial bit loading (e.g., the bit loading calculated in step 703 or step 753) can put a constraint that more than 1 bit should not be added to any subcarrier. This constraint can simplify the algorithm (e.g., the process 700 and the process 750) compared to an algorithm without computing the initial bit loading (e.g., the process 600).

Figure 8:
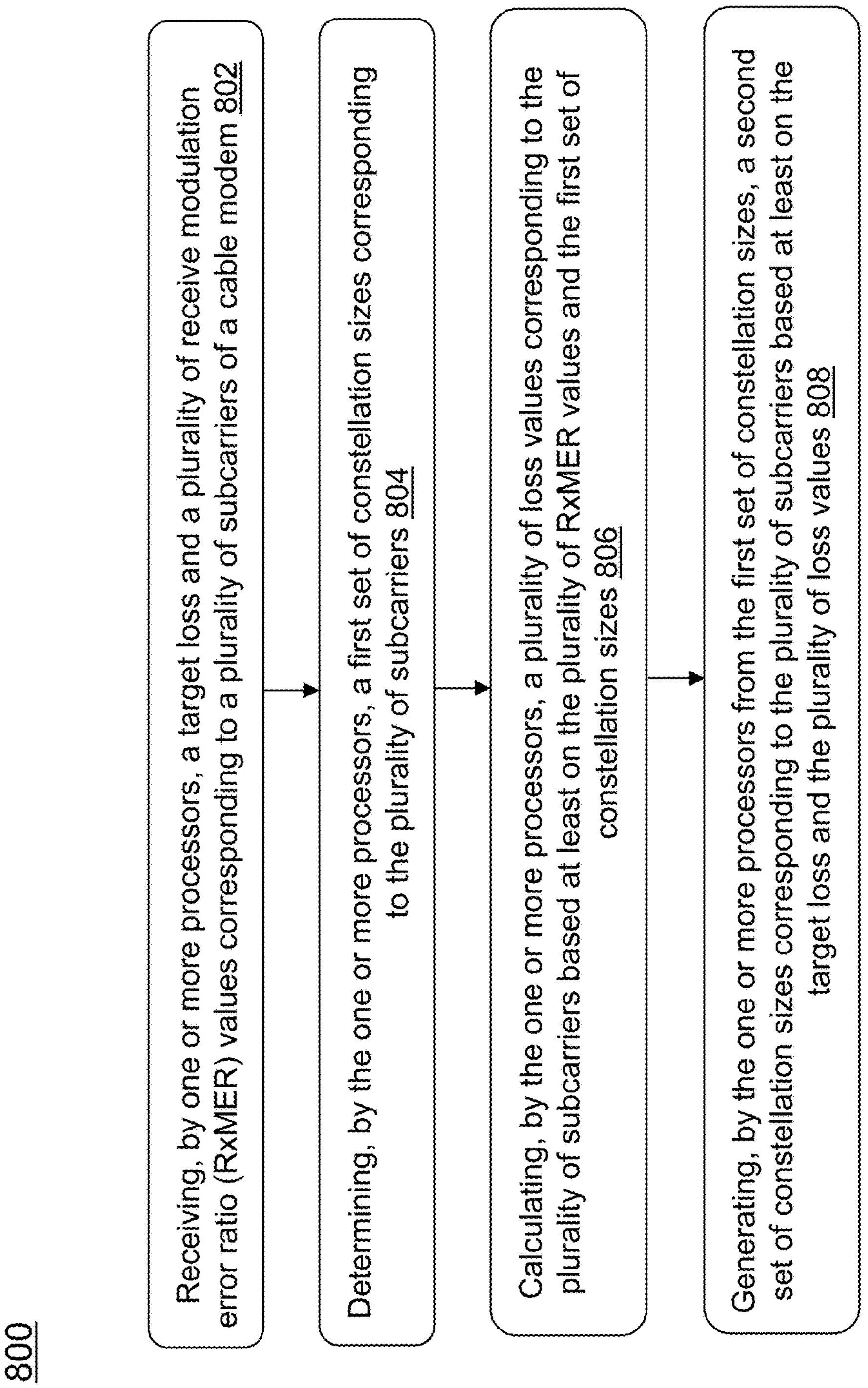
FIG. 8 is a flow diagram showing a process for optimizing bit loading profiles for high net bit rate of cable modems, in accordance with an embodiment.

FIG. 8 is a flow diagram showing a process 800 for optimizing bit loading profiles for high net bit rate of cable modems, in accordance with an embodiment. In some implementations, the process 800 is performed by one or more processors. The one or more processors may include one or more processors of a cable modem (e.g. processor 2010 of cable modem 300, 360, 400) and/or one or more processors of a server (e.g., processor 2010 of server 380, 450). In some implementations, the server may include at least one of a computing device or a cloud system. In some embodiments, the process 800 is performed by other entities (e.g., a computing system other than the cable modem 400 or server 450). In some implementations, the process 800 includes more, fewer, or different steps than shown in FIG. 8.

At step 802, the one or more processors may receive a loss target value (e.g., Loss_Target) and a plurality of receive modulation error ratio (RxMER) values (e.g., RxMER values 501, $RxMER_m$; $1 \le m \le n$; m, n are integers) corresponding to a plurality of subcarriers of a cable modem (e.g., n subcarriers).

At step 804, the one or more processors may determine a first set of constellation sizes (e.g., bit loading profile 504, $BL_m$; $1 \le m \le n$; m, n are integers) corresponding to the plurality of subcarriers (e.g., n subcarriers).

At step 806, the one or more processors may calculate a plurality of loss values (e.g., $LV_m$; $1 \le m \le n$) corresponding to the plurality of subcarriers (e.g., n subcarriers) based at least on the plurality of RxMER values (e.g., $RxMER_m$) and the first set of constellation sizes (e.g., $BL_m$). In some implementations, given a constellation size $BL_m$ and an RxMER value $RxMER_m$, a system (e.g., a cable modem or a server) can identify or obtain a loss value $LV_m$ by looking up the loss table using the constellation size $BL_m$ and the RxMER value $RxMER_m$.

In some implementations, each of the first set of constellation sizes (e.g., $BL_m$ as a result of initial bit loading at step 703 or step 753) corresponding to a subcarrier may be a maximum constellation size that (1) maintains a complement value (e.g., $CV\_per\_bit_m$; see step 703) corresponding to the subcarrier to be greater than or equal to a complement target value (e.g., Complement_Target) and (2) equals the complement value corresponding to the subcarrier plus a loss value corresponding to the subcarrier (see Equation 1). The loss target value (e.g., Loss_Target) plus the complement target value (e.g., Complement_Target) may equal a constant (e.g., 1). For example, Loss_Target is 0.015 and Complement_Target is 0.985.

At step 808, the one or more processors may generate a second set of constellation sizes (e.g., $BL_m$ as a result of iterations at step 602 to step 608; $BL_m$ as a result of iterations at step 704 to step 710; or $BL_m$ as a result of performing step 754 to step 757) corresponding to the plurality of subcarriers based at least on the loss target value (e.g., Loss_Target) and the plurality of loss values (e.g., $LV_m$).

In some implementations, in generating the second set of constellation sizes (e.g., $BL_m$ as a result of performing step 754 to step 757 in the process 750), the one or more processors may be configured to determine a plurality of increments (e.g., CV_delta_add$_k$ (k=1, . . . , n)) corresponding to the plurality of subcarriers (e.g., n subcarriers), such that an increment corresponding to each of the plurality of subcarriers is an amount of a value that is increased in a complement value corresponding to the subcarrier when a constellation size in the first set of constellation size corresponding to the subcarrier is increased by one (see Equation 5). The one or more processors may be configured to determine, among the plurality of increments, a set of increments such that a sum of the complement target value minus each increment, over the set of increments, is less than or equal to a threshold value (e.g., Surplus; see Inequality 1; see step 756). The one or more processors may be configured to increase by one, a constellation value in the first set of constellation sizes corresponding to each of the determined set of increments to generate the second set of constellation sizes (see step 757).

In some implementations, the threshold value (e.g., Surplus) may equals a sum of a plurality of complement values corresponding to the plurality of subcarriers minus the complement target value multiplied by a sum of the first set of constellation sizes (see Equation 15). In some implementations, the set of increments may have a maximum size such that a sum of the complement target value minus each increment, over the set of increments, is greater than the threshold value (e.g., see Inequality 1; see step 756). In some implementations, the second set of constellation sizes do not include constellation sizes of 1, 2, 3 and 5.

In some implementations, in generating the second set of constellation sizes (e.g., $BL_m$ as a result of iterations at step 602 to step 608 in the process 600), the one or more processors may be configured to determine a plurality of complement values (e.g., $CV_m$) corresponding to the plurality of subcarriers such that a constellation size (e.g., $BL_m$) in the first set of constellation sizes corresponding to each subcarrier equals a complement value (e.g., $CV_m$) corresponding to the subcarrier plus a loss value (e.g., $LV_m$) corresponding to the subcarrier (see Equation 1). The one or more processors may be configured to determine a first ratio (e.g., Loss_per_bit) of a sum of the plurality of loss values to the sum of the first set of constellation sizes (see Equation 9). The one or more processors may be configured to determine whether the first ratio (e.g., Loss_per_bit) is greater than the loss target value (e.g., Loss_Target). See step 603 of the process 600. The one or more processors may be configured to generate the second set of constellation sizes based on a result of determining whether the first ratio is greater than the loss target value.

In some implementations, in generating the second set of constellation sizes, in response to determining that the first ratio is greater than the loss target value (e.g., step 604), the one or more processors may be configured to identify a subcarrier, among the plurality of subcarriers, with a maximum amount of a value that is decreased in a complement value corresponding to the subcarrier (e.g., CV_delta_sub$_m$; see Equation 6) when a constellation size in the first set of constellation size corresponding to the subcarrier is decreased by one. The one or more processors may be configured to decrease by one, the constellation value in the first set of constellation sizes corresponding to the identified subcarrier (see step 605 and Equation 11).

In some implementations, in generating the second set of constellation sizes, in response to determining that the first ratio is less than or equal to the loss target value (e.g., step 606), the one or more processors may be configured to identify a subcarrier, among the plurality of subcarriers, with a maximum amount of a value that is increased in a complement value corresponding to the subcarrier (e.g., CV_delta_add$_m$; see Equation 5) when a constellation size in the first set of constellation size corresponding to the subcarrier is increased by one. The one or more processors may be configured to increase by one, the constellation value in the first set of constellation sizes corresponding to the identified subcarrier (see step 607 and Equation 12).

In some implementations, the cable modem (e.g., cable modem 300, 360-0, 400) may be configured to monitor (e.g., SNR margin monitor 362-0) a change of signal-to-noise ratio (SNR) margins for a predetermined duration of time. The cable modem may be configured to determine the change of SNR margins falls below or exceeds a threshold value. The cable modem may be configured to transmit the plurality of RxMER values (e.g., RxMER values 401, 501) to a server (e.g., server 380, 450). The server may be configured to generate the second set of constellation sizes (e.g., optimized bit loading profile 471; bit loading profile as a result of the process 600, the process 700, or the process 750). The cable modem may be configured to receive, from the server, the second set of constellation sizes.

In some implementations, the one or more processors can determine a net bit rate based on the second set of constellation sizes, and monitor, using the determined net bit rate, health (e.g., performance or quality) of a network link of the cable modem. For example, the system (e.g., server or a cable modem) can perform a synthesis of an optimal bit loading profile for OFDM, and provide, as a result, (1) a metric for assessing the "health" of a network link of a cable modem and comparing the metric to the own history of the cable modem and to a metric of other cable modems.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, In some implementations, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C #, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system, comprising one or more processors configured to:
- receive a loss target value and a plurality of receive modulation error ratio (RxMER) values corresponding to a plurality of subcarriers of a cable modem;
- determine a first set of constellation sizes corresponding to the plurality of subcarriers;
- calculate a plurality of loss values corresponding to the plurality of subcarriers based at least on the plurality of RxMER values and the first set of constellation sizes; and
- generate a second set of constellation sizes corresponding to the plurality of subcarriers based at least on the loss target value and the plurality of loss values.

2. The system of claim 1, wherein
- the one or more processors comprises one or more processors of the cable modem and one or more processors of a server that includes at least one of a computing device or a cloud system, and
- the one or more processors of the cable modem are configured to:
  - monitor a change of signal-to-noise ratio (SNR) margins for a predetermined duration of time;
  - determine the change of SNR margins falls below or exceeds a threshold value;
  - transmit the plurality of RxMER values to a server wherein the one or more processors of the server is configured to generate the second set of constellation sizes, wherein; and
  - receiving, from the server, the second set of constellation sizes.

3. The system of claim 1, wherein
- each of the first set of constellation sizes corresponding to a subcarrier is a maximum constellation size that (1) maintains a complement value corresponding to the subcarrier to be greater than or equal to a complement target value and (2) equals the complement value corresponding to the subcarrier plus a loss value corresponding to the subcarrier, and
- the loss target value plus the complement target value equal a constant.

4. The system of claim 3, wherein in generating the second set of constellation sizes, the one or more processors are configured to:
- determine a plurality of increments corresponding to the plurality of subcarriers, such that an increment corresponding to each of the plurality of subcarriers is an amount of a value that is increased in a complement value corresponding to the subcarrier when a constellation size in the first set of constellation size corresponding to the subcarrier is increased by one;
- determine, among the plurality of increments, a set of increments such that a sum of the complement target value minus each increment, over the set of increments, is less than or equal to a threshold value; and
- increase by one, a constellation value in the first set of constellation sizes corresponding to each of the determined set of increments to generate the second set of constellation sizes.

5. The system of claim 4, wherein the threshold value equals a sum of a plurality of complement values corresponding to the plurality of subcarriers minus the complement target value multiplied by a sum of the first set of constellation sizes.

6. The system of claim 4, wherein the set of increments has a maximum size such that a sum of the complement target value minus each increment, over the set of increments, is greater than the threshold value.

7. The system of claim 1, wherein the second set of constellation sizes do not include constellation sizes of 1, 2, 3 and 5.

8. The system of claim 1, wherein in generating the second set of constellation sizes, the one or more processors are configured to:
- determine a plurality of complement values corresponding to the plurality of subcarriers such that a constellation size in the first set of constellation sizes corresponding to each subcarrier equals a complement value corresponding to the subcarrier plus a loss value corresponding to the subcarrier;
- determine a first ratio of a sum of the plurality of loss values to the sum of the first set of constellation sizes;
- determine whether the first ratio is greater than the loss target value; and
- generate the second set of constellation sizes based on a result of determining whether the first ratio is greater than the loss target value.

9. The system of claim 8, wherein in generating the second set of constellation sizes, in response to determining that the first ratio is greater than the loss target value, the one or more processors are configured to
- identify a subcarrier, among the plurality of subcarriers, with a maximum amount of a value that is decreased in a complement value corresponding to the subcarrier when a constellation size in the first set of constellation size corresponding to the subcarrier is decreased by one; and
- decrease by one, the constellation value in the first set of constellation sizes corresponding to the identified subcarrier.

10. The system of claim 8, wherein the one or more processors are configured to:
- determine a net bit rate based on the second set of constellation sizes; and
- monitor, using the determined net bit rate, performance or quality of a network link of the cable modem.

11. A method, comprising:

receiving, by one or more processors, a loss target value and a plurality of receive modulation error ratio (RxMER) values corresponding to a plurality of subcarriers of a cable modem;

determining, by the one or more processors, a first set of constellation sizes corresponding to the plurality of subcarriers;

calculating, by the one or more processors, a plurality of loss values corresponding to the plurality of subcarriers based at least on the plurality of RxMER values and the first set of constellation sizes; and generating, by the one or more processors, a second set of constellation sizes corresponding to the plurality of subcarriers based at least on the loss target value and the plurality of loss values.

12. The method of claim 11, further comprising:

monitoring, by the cable modem, a change of signal-to-noise ratio (SNR) margins for a predetermined duration of time;

determining, by the cable modem, the change of SNR margins falls below or exceeds a threshold value;

transmitting, by the cable modem, the plurality of RxMER values to a server to control the server to generate the second set of constellation sizes, wherein the server includes at least one of a computing device or a cloud system; and receiving, by the cable modem from the server, the second set of constellation sizes.

13. The method of claim 11, wherein each of the first set of constellation sizes corresponding to a subcarrier is a maximum constellation size that (1) maintains a complement value corresponding to the subcarrier to be greater than or equal to a complement target value and (2) equals the complement value corresponding to the subcarrier plus a loss value corresponding to the subcarrier, and the loss target value plus the complement target value equal a constant.

14. The method of claim 13, wherein generating the second set of constellation sizes comprises:

determining a plurality of increments corresponding to the plurality of subcarriers, such that an increment corresponding to each of the plurality of subcarriers is an amount of a value that is increased in a complement value corresponding to the subcarrier when a constellation size in the first set of constellation size corresponding to the subcarrier is increased by one;

determining, among the plurality of increments, a set of increments such that a sum of the complement target value minus each increment, over the set of increments, is less than or equal to a threshold value; and increasing by one, a constellation value in the first set of constellation sizes corresponding to each of the determined set of increments to generate the second set of constellation sizes.

15. The method of claim 14, wherein the threshold value equals a sum of a plurality of complement values corresponding to the plurality of subcarriers minus the complement target value multiplied by a sum of the first set of constellation sizes.

16. The method of claim 14, wherein the set of increments has a maximum size such that a sum of the complement target value minus each increment, over the set of increments, is greater than the threshold value.

17. The method of claim 11, wherein the second set of constellation sizes do not include constellation sizes of 1, 2, 3 and 5.

18. The method of claim 11, wherein generating the second set of constellation sizes comprises:

determining a plurality of complement values corresponding to the plurality of subcarriers such that a constellation size in the first set of constellation sizes corresponding to each subcarrier equals a complement value corresponding to the subcarrier plus a loss value corresponding to the subcarrier;

determining a first ratio of a sum of the plurality of loss values to the sum of the first set of constellation sizes;

determining whether the first ratio is greater than the loss target value; and generating the second set of constellation sizes based on a result of determining whether the first ratio is greater than the loss target value.

19. The method of claim 18, wherein generating the second set of constellation sizes comprises in response to determining that the first ratio is greater than the loss target value:

identifying a subcarrier, among the plurality of subcarriers, with a maximum amount of a value that is decreased in a complement value corresponding to the subcarrier when a constellation size in the first set of constellation size corresponding to the subcarrier is decreased by one; and decreasing by one, the constellation value in the first set of constellation sizes corresponding to the identified subcarrier.

20. The method of claim 11, further comprising:

determining a net bit rate based on the second set of constellation sizes; and monitoring, using the determined net bit rate, performance or quality of a network link of the cable modem.

* * * * *